US012633253B2

(12) United States Patent
Kim et al.

(10) Patent No.: US 12,633,253 B2
(45) Date of Patent: May 19, 2026

(54) GATE DRIVING CIRCUIT, DISPLAY DEVICE INCLUDING THE SAME, AND ELECTRONIC DEVICE INCLUDING THE DISPLAY DEVICE

(71) Applicant: Samsung Display Co., Ltd., Yongin-si (KR)

(72) Inventors: Eok Su Kim, Yongin-si (KR); Joon Seok Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/188,165

(22) Filed: Apr. 24, 2025

(65) Prior Publication Data

US 2026/0105881 A1 Apr. 16, 2026

(30) Foreign Application Priority Data

Oct. 14, 2024 (KR) ........................ 10-2024-0139259

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01)

(58) Field of Classification Search
CPC ............. G09G 3/32; G09G 2310/0267; G09G 2310/0275; G09G 2310/08; G09G 3/3677; G09G 2300/0809; G09G 2310/0286; G11C 19/184
See application file for complete search history.

(56) References Cited

U.S. PATENT DOCUMENTS

| | | | | |
|---|---|---|---|---|
| 9,202,827 | B2 | 12/2015 | Koyama et al. | |
| 11,087,696 | B2 * | 8/2021 | Kim | G09G 3/3225 |
| 11,888,069 | B2 * | 1/2024 | Lee | H10D 30/6733 |
| 2020/0234654 | A1 * | 7/2020 | Kim | G09G 3/3291 |
| 2022/0358873 | A1 * | 11/2022 | Hwang | G09G 3/3266 |
| 2024/0257724 | A1 * | 8/2024 | Kim | G09G 3/3677 |
| 2024/0296777 | A1 * | 9/2024 | In | G09G 3/2092 |

* cited by examiner

*Primary Examiner* — Amy Onyekaba
(74) *Attorney, Agent, or Firm* — Womble Bond Dickinson (US) LLP

(57) ABSTRACT

A gate driver includes a pull-up control circuit configured to apply a previous carry signal to a pull-up control node in response to the previous carry signal among carry signals of previous gate drivers, a buffer transistor configured to output a gate clock signal as a gate output signal in response to a signal of the pull-up control node, and including an upper gate electrode connected to the pull-up control node and a lower gate electrode connected to a stabilization node, a first stabilization transistor including a gate electrode connected to the pull-up control node and a first electrode connected to the stabilization node, and a second stabilization transistor including a gate electrode connected to a pull-down control node and a first electrode connected to the stabilization node.

20 Claims, 12 Drawing Sheets

GATE DRIVING CIRCUIT, DISPLAY DEVICE INCLUDING THE SAME, AND ELECTRONIC DEVICE INCLUDING THE DISPLAY DEVICE

CROSS-REFERENCE TO RELATED APPLICATION

The present application claims priority to, and the benefit of, Korean Patent Application No. 10-2024-0139259, filed on Oct. 14, 2024, in the Korean Intellectual Property Office, the entire disclosure of which is incorporated herein by reference.

BACKGROUND

1. Field

Aspects of one or more embodiments of the present disclosure described herein relate to a gate driver (e.g., a gate-driving circuit), and a display device including the same. For example, one or more embodiments relate to the gate driver with improved reliability and the display device including the same.

2. Description of the Related Art

In general, a display device includes a display panel and a display panel driver. The display panel displays an image based on an input image and includes a plurality of gate lines, a plurality of data lines, and a plurality of pixels. The display panel driver includes a gate driver that provides a gate signal to the plurality of gate lines and a data driver that provides a data voltage to the data lines.

Recently, for implementing a high-resolution display device, research is being conducted to reduce an area where pixels are not located in the display device and to increase a number of pixels per unit area. As the area where pixels are not located decreases, a number of conductive layers that are stacked adjacent to each other in the gate driver may increase. Accordingly, an increased coupling between adjacent conductive layers may be generated.

SUMMARY

Aspects of one or more embodiments of the present disclosure provide a gate driver with improved electronic stability.

Aspects of one or more embodiments of the present disclosure provide a display device including the gate driver.

According to one or more embodiments, a gate driver includes a pull-up control circuit configured to apply a previous carry signal to a pull-up control node in response to the previous carry signal of a previous gate driver, a buffer transistor configured to output a gate clock signal as a gate output signal in response to a signal of the pull-up control node, and including an upper gate electrode connected to the pull-up control node, and a lower gate electrode connected to a stabilization node, a first stabilization transistor including a gate electrode connected to the pull-up control node, and a first electrode connected to the stabilization node, and a second stabilization transistor including a gate electrode connected to a pull-down control node, and a first electrode connected to the stabilization node.

The pull-up control circuit may include a first pull-up control transistor including a gate electrode to which the previous carry signal is configured to be applied, a first electrode to which the previous carry signal is configured to be applied, and a second electrode, and a second pull-up control transistor including a gate electrode to which the previous carry signal is configured to be applied, a first electrode connected to the pull-up control node, and a second electrode connected to the second electrode of the first pull-up control transistor.

The gate driver may further include a substrate, a first lower metal layer above the substrate, and a second lower metal layer above the first lower metal layer, and including the lower gate electrode of the buffer transistor, wherein an active pattern of the second pull-up control transistor and the gate electrode of the second pull-up control transistor are between the first lower metal layer and the second lower metal layer in a cross-sectional view, wherein an active pattern of the buffer transistor and the upper gate electrode of the buffer transistor are above the second lower metal layer.

The gate driver may further include a connection electrode electrically connecting the upper gate electrode of the buffer transistor and the second electrode of the second pull-up control transistor.

The connection electrode may contact the gate electrode of the first stabilization transistor.

The connection electrode may be separated from the second lower metal layer in a cross-sectional view.

A first electrode of the buffer transistor and a second electrode of the buffer transistor may be above the connection electrode.

The first stabilization transistor may further include a second electrode to which a high gate voltage defining a high level of the gate output signal is configured to be applied.

The second electrode of the first stabilization transistor may be above the connection electrode.

The first stabilization transistor may further include a second electrode connected to the pull-up control node.

The connection electrode may include the second electrode of the first stabilization transistor.

The second electrode of the first stabilization transistor may be at a same layer as the connection electrode.

The second lower metal layer may overlap the second electrode of the second pull-up control transistor.

The second stabilization transistor may further include a second electrode configured to receive a low voltage.

According to one or more embodiments, a display device includes a substrate including a display area, and a peripheral area adjacent to the display area, a first lower metal layer in the peripheral area above the substrate, a pull-up control transistor in the peripheral area above the first lower metal layer, and including a first active pattern, and a first gate electrode above the first active pattern, a second lower metal layer in the peripheral area above the first gate electrode of the pull-up control transistor, a buffer transistor in the peripheral area above the second lower metal layer, and including a second active pattern overlapping the second lower metal layer, and a second gate electrode above the second active pattern, a first stabilization transistor in the peripheral area above the second lower metal layer, and including a third active pattern overlapping the second lower metal layer, and a third gate electrode above the third active pattern, a connection electrode above the second gate electrode and the third gate electrode, and contacting the second gate electrode and the third gate electrode, and a light-emitting element in the display area above the connection electrode.

The connection electrode may be separated from the second lower metal layer.

The connection electrode may contact a portion of the third active pattern.

The display device may further include a second stabilization transistor in the peripheral area above the second lower metal layer, and including a fourth active pattern overlapping the second lower metal layer, and a fourth gate electrode above the fourth active pattern, wherein the third active pattern, the fourth active pattern, and the second lower metal layer are electrically connected.

The display device may further include at least one pixel including the light-emitting element in the display area, a gate driver configured to output a gate output signal, in the peripheral area, and including the pull-up control transistor, the buffer transistor, the first stabilization transistor, and the second stabilization transistor, and a gate line configured to transmit the gate output signal to the pixel.

According to one or more embodiments, an electronic device includes a display panel including at least one pixel, a gate line electrically connected to the pixel, or a data line electrically connected to the pixel, a gate driver configured to output a gate output signal to the gate line, and including a pull-up control circuit configured to apply a previous carry signal to a pull-up control node in response to the previous carry signal of a previous gate driver, a buffer transistor configured to output a gate clock signal as the gate output signal in response to a signal of the pull-up control node, and including an upper gate electrode connected to the pull-up control node, and a lower gate electrode connected to a stabilization node, a first stabilization transistor including a gate electrode connected to the pull-up control node, and a first electrode connected to the stabilization node, and a second stabilization transistor including a gate electrode connected to a pull-down control node, and a first electrode connected to the stabilization node, a data driver configured to output a data voltage to the data line, a driving controller configured to control the display panel, the gate driver, and the data driver, and a processor configured to output input image data and an input control signal to the driving controller.

In one or more embodiments, a gate driver of a first stabilization transistor and a second stabilization transistor may be connected to a lower gate electrode of a buffer transistor. In addition, a first connection electrode may contact an upper gate electrode of the buffer transistor and may not contact a second lower metal layer defining the lower gate electrode of the buffer transistor. Accordingly, a coupling phenomenon generated by the second lower metal layer and a contact electrode located (e.g., disposed) under the second lower metal layer overlapping each other in a plan view may not be directly transmitted to the upper gate electrode of the buffer transistor through the first connection electrode. Accordingly, instability generated by fluctuations in a voltage of the upper gate electrode of the buffer transistor may be reduced.

In one or more embodiments, a gate driver includes the gate-driving circuit, and the gate driver operates stably, and thus a reliability of the display device may be improved. In addition, as a portion of a pull-up control transistor and a portion of the buffer transistor overlap in a plan view, a peripheral area of the display panel is reduced, and thus the display device with a high resolution may be implemented.

In one or more embodiments, the electronic device includes a mobile phone, a smartphone, a tablet personal computer (PC), a mobile communication terminal, an electronic organizer, an electronic book, a portable multimedia player (PMP), a navigation system, a navigation device, an ultra-mobile PC (UMPC), a television, a laptop, a monitor, an electric vehicle, a billboard, an Internet of Things (IoT) device, a smartwatch, a watch phone, and/or a head-mounted display (HMD).

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
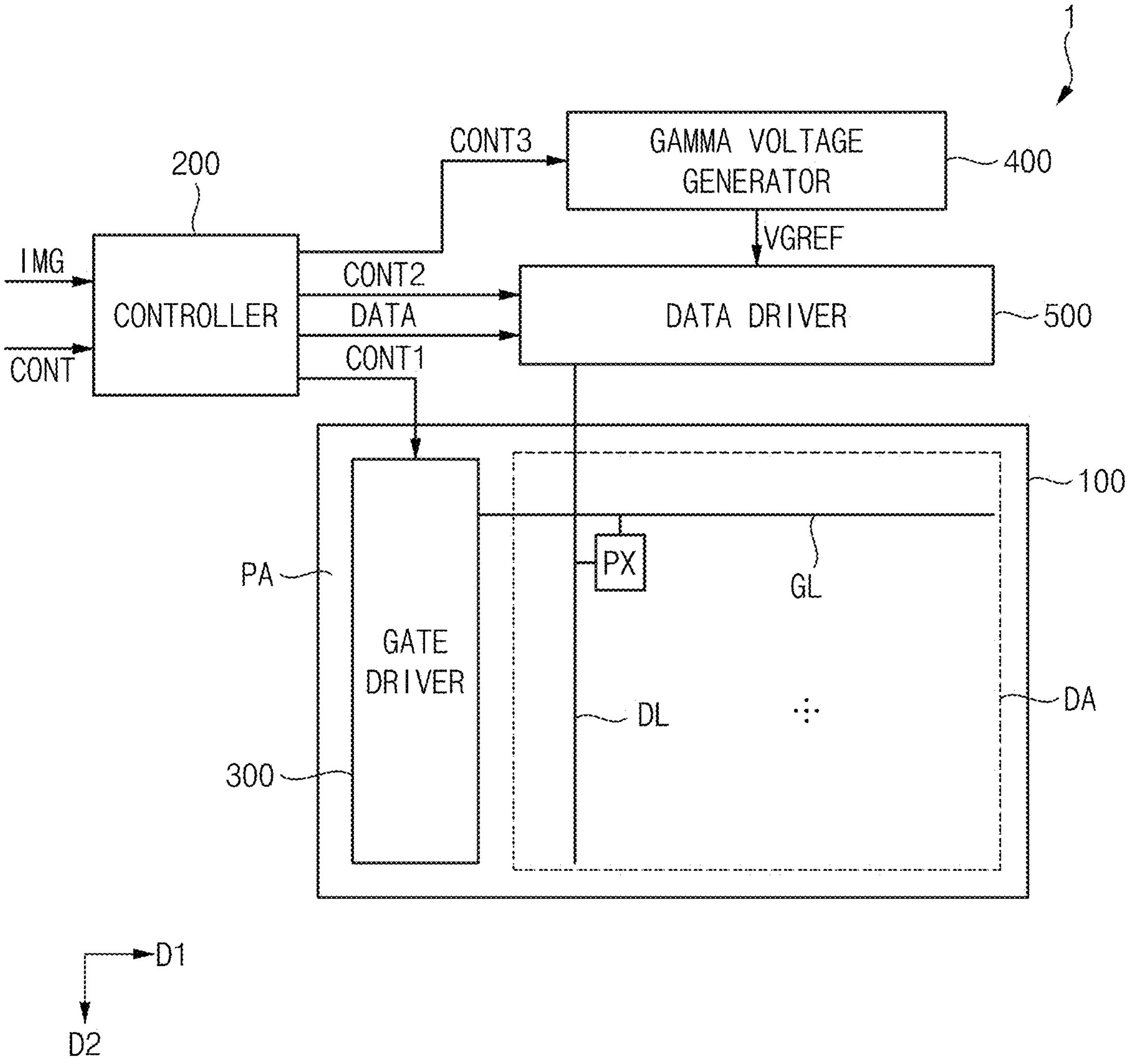
FIG. 1 is a block diagram illustrating a display device according to one or more embodiments of the present disclosure.

Aspects of embodiments of the present disclosure and methods of accomplishing the same may be understood more readily by reference to the detailed description of embodiments and the accompanying drawings. Hereinafter, aspects of some embodiments will be described in more detail with reference to the accompanying drawings. The described embodiments, however, may be embodied in one or more suitable different forms, and should not be construed as being limited to only the illustrated embodiments herein. Rather, these embodiments are provided as examples so that the present disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

One or more suitable embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the present disclosure. Thus, embodiments disclosed herein should not be construed as limited to the particular illustrated shapes of regions, but are to include deviations in shapes that result from, for instance, manufacturing.

For example, an implanted region illustrated as a rectangle may have rounded or curved shapes and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in one or more suitable different ways, all without departing from the spirit or scope of the present disclosure.

In the detailed description, for the purposes of explanation, numerous specific details are set forth to provide a thorough understanding of one or more suitable embodiments. It is apparent, however, that one or more suitable embodiments may be practiced without these specific details or with one or more equivalent arrangements. In other instances, well-known structures and devices are shown in block diagram form to avoid unnecessarily obscuring one or more suitable embodiments.

Spatially relative terms, such as "beneath," "below," "lower," "under," "above," "upper," and the like, may be utilized herein for ease of explanation to describe one element's relationship to another element(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements would then be oriented "above" the other elements. Thus, the example terms "below" and "under" can encompass both an orientation of above and below. The device may be otherwise oriented (e.g., rotated 90 degrees or at other orientations) and the spatially relative descriptors utilized herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "in a plan view," means viewing a target portion from the top, and the phrase "on a cross-section" means viewing a cross-section formed by vertically cutting a target portion from the side.

It will be understood that when an element, area, layer, part, portion, region, or component is referred to as being "formed on," "disposed on," "on," "connected to," "connected with," or "coupled to" another element, area, layer, part, portion, region, or component, it can be directly formed on, disposed on, on, connected to, connected with, or coupled to the other element, area, layer, part, portion, region, or component, or indirectly formed on, disposed on, on, connected to, connected with, or coupled to the other element, area, layer, part, portion, region, or component, such that one or more intervening elements, areas, layers, parts, portions, regions, or components may be present. For example, when an element, layer, part, portion, region, or component is referred to as being "electrically connected" or "electrically coupled" to another element, layer, part, portion, region, or component, it can be directly electrically connected or coupled to the other element, layer, part, portion, region, or component, or intervening elements, layers, parts, portions, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of the present disclosure, expressions such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, XZ, YZ, and ZZ, or any variation thereof. Similarly, the expression such as "at least one of A and/or B" may include A, B, or A and B. As utilized herein, the term "and/or" includes any and all combinations of one or more of the associated listed items. For example, the expression such as "A and/or B" may include A, B, or A and B. Further, the use of "may" when describing embodiments of the present disclosure refers to "one or more embodiments of the present disclosure".

The same reference numerals refer to the same components. Further, in the drawings, the thickness, the ratio, and the dimension of components are exaggerated for effective description of technical contents. The expression "and/or" includes one or more combinations which associated components are capable of defining.

It will be understood that, although the terms "first", "second", etc. may be used herein to describe one or more suitable components, the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

Also, the terms “under”, “below”, “on”, “above”, etc. are used to describe the correlation of components illustrated in drawings. The terms that are relative in concept are described based on a direction illustrated in drawings.

The terminology utilized herein is for the purpose of describing particular embodiments only and is not intended to be limiting of the present disclosure. As utilized herein, the singular forms “a” and “an” are intended to include the plural forms as well, unless the context clearly indicates otherwise. It will be further understood that the terms “comprise,” “comprises,” “comprising,” “has,” “have,” “having,” “include,” “includes,” and “including,” when utilized in this specification, specify the presence of the stated features, integers, steps, operations, elements, and/or components, but do not preclude the presence or addition of one or more other features, integers, steps, operations, elements, components, and/or groups thereof.

As utilized herein, the term “substantially,” “about,” “approximately,” and similar terms are utilized as terms of approximation and not as terms of degree, and are intended to account for the inherent deviations in measured or calculated values that would be recognized by those of ordinary skill in the art. “About” or “approximately,” as utilized herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic or electric devices and/or any other relevant devices or components according to one or more embodiments of the present disclosure described herein may be implemented utilizing any suitable hardware, firmware (e.g., an application-specific integrated circuit), software, or a combination of software, firmware, and hardware. For example, the one or more suitable components of these devices may be formed on one integrated circuit (IC) chip or on separate IC chips. Further, the one or more suitable components of these devices may be implemented on a flexible printed circuit film, a tape carrier package (TCP), a printed circuit board (PCB), or formed on one substrate.

In the present disclosure, it will be understood that the terms “include/includes/including,” “comprise/comprises/comprising,” or “have/has/having,” specifies the presence of stated features, integers, numbers, steps, operations, elements, and/or components, but do not preclude the presence or addition of one or more other features, integers, numbers, steps, operations, elements, components, and/or groups thereof. Additionally, the terms “include/includes/including,” “comprise/comprises/comprising,” or “have/has/having,” or similar terms include or support the terms “consisting of” and “consisting essentially of,” indicating the presence of stated features, integers, steps, operations, elements, and/or components, without or essentially without the presence of other features, integers, steps, operations, elements, components, and/or groups thereof.

Unless otherwise defined, all terms (including technical terms and scientific terms) used in the specification have the same meaning as commonly understood by those skilled in the art to which the present disclosure belongs. Further, terms such as terms defined in the dictionaries commonly used should be interpreted as having a meaning consistent with the meaning in the context of the related technology and should not be interpreted in overly ideal or overly formal meanings unless explicitly defined herein.

Terms “part” and “unit” mean a software component or hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, program code segments, drivers, firmwares, microcodes, circuits, data, database, data structures, tables, arrays, or variables.

Hereinafter, display devices in accordance with embodiments will be described in more detail with reference to the accompanying drawings. The same reference numerals are used for the same components in the drawings, and redundant descriptions of the same components will be omitted.

FIG. 1 is a block diagram illustrating a display device according to one or more embodiments of the present disclosure.

Referring to FIG. 1, the display device 1 may include a display panel 100 and a display panel driver. The display panel driver may include a driving controller 200, a gate driver 300, a gamma voltage generator 400, and a data driver 500.

In one or more embodiments, the driving controller 200 and the data driver 500 may be integrated. In one or more embodiments, the driving controller 200, the gamma voltage generator 400, and the data driver 500 may be integrated. For example, a driving module which is provided by (e.g., formed by) an integration of the driving controller 200 and the data driver 500 may be referred to as a timing controller embedded data driver (TED).

The display panel 100 may include a display area DA defined as an area for displaying an image and a peripheral area PA adjacent to the display area DA. The display panel 100 may include a plurality of pixels PX, a plurality of gate lines GL, and a plurality of data lines DL. The plurality of pixels PX, the plurality of gate lines GL, and the plurality of data lines DL may be located/arranged in (e.g., disposed in)

the display area DA of the display panel 100. The display panel driver may be in the peripheral area PA of the display panel 100.

In the present disclosure, a plane may be defined by a first direction D1 and a second direction D2 crossing the first direction D1. For example, the second direction D2 may be perpendicular to the first direction D1. In addition, the third direction D3 may be perpendicular to the plane.

The plurality of pixels PX may be in a matrix form including a plurality of pixel rows and a plurality of pixel columns. The plurality of pixels PX may be arranged (e.g., disposed) along a first direction DR1 and a second direction DR2. One pixel among the plurality of pixels PX may include sub-pixels emitting light of different colors. For example, the one pixel may include a first sub-pixel emitting a first color light, a second sub-pixel emitting a second color light, and a third sub-pixel emitting a third color light. In one or more embodiments, the first color light may be red light, the second color light may be green light, and the third color light may be blue light. However, a color of light emitted by each of the first sub-pixel, the second sub-pixel, and the third sub-pixel according to one or more embodiments of the present disclosure may not be necessarily limited thereto. For example, each of the first sub-pixel, the second sub-pixel, and the third sub-pixel may be combined to emit magenta light, cyan light, and yellow light, respectively.

Each of the plurality of gate lines GL may extend along a first direction D1. Each of the plurality of gate lines GL may be separated from (e.g., spaced apart from) each other in a second direction D2. Each of the plurality of data lines DL may extend along a second direction D2. Each of the plurality of data lines DL may be separated from (e.g., spaced apart from) each other in the first direction D1.

In one or more embodiments, each of the plurality of pixels PX may be electrically connected to at least one gate line of the plurality of gate lines GL and at least one data line of the plurality of data lines DL.

The driving controller 200 may receive input image data IMG and an input control signal CONT from an external device (e.g., a host processor, such as a graphic processing unit (GPU)). In one or more embodiments, the input image data IMG may include red image data, green image data, and/or blue image data. In one or more embodiments, the input image data IMG may further include white image data. In one or more other embodiments, the input image data IMG may include magenta image data, yellow image data, and/or cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3, and/or a data signal DATA based on the input image data IMG and the input control signal CONT.

The driving controller 200 may generate a gate control signal CONT1 for controlling the operation of the gate driver 300 based on the input control signal CONT. The driving controller 200 may output the gate control signal CONT1 to the gate driver 300. The gate control signal CONT1 may include a vertical start signal and a gate clock signal.

The driving controller 200 may generate a data control signal CONT2 for controlling the operation of the data driver 500 based on the input control signal CONT. The driving controller 200 may output the data control signal CONT2 to the data driver 500. The data control signal CONT2 may include a horizontal start signal and a load signal.

The driving controller 200 may generate a data signal DATA based on the input image data IMG. The driving controller 200 may output a data signal DATA to the data driver 500.

The driving controller 200 may generate the gamma control signal CONT3 for controlling the operation of the gamma voltage generator 400 based on the input control signal CONT. The driving controller 200 may output the gamma control signal CONT3 to the gamma voltage generator 400.

The gate driver 300 may generate output signals for driving a plurality of gate lines GL in response to the gate control signal CONT1 received from the driving controller 200. In one or more embodiments, the gate driver 300 may be mounted in the peripheral area PA of the display panel 100. For example, the gate driver 300 may be integrated in the peripheral area PA of the display panel 100.

The gamma voltage generator 400 may generate a gamma reference voltage VGREF in response to the gamma control signal CONT3 received from the driving controller 200. The gamma voltage generator 400 may provide the gamma reference voltage VGREF to the data driver 500. In one or more embodiments, the gamma voltage generator 400 may be in the driving controller 200 or in the data driver 500.

The data driver 500 may receive the data control signal CONT2 and the data signal DATA from the driving controller 200. The data driver 500 may receive the gamma reference voltage VGREF from the gamma voltage generator 400. The data driver 500 may convert the data signal DATA into an analog data voltage using the gamma reference voltage VGREF. The data driver 500 may output the data voltage to each of a plurality of data lines DL.

Figure 2:
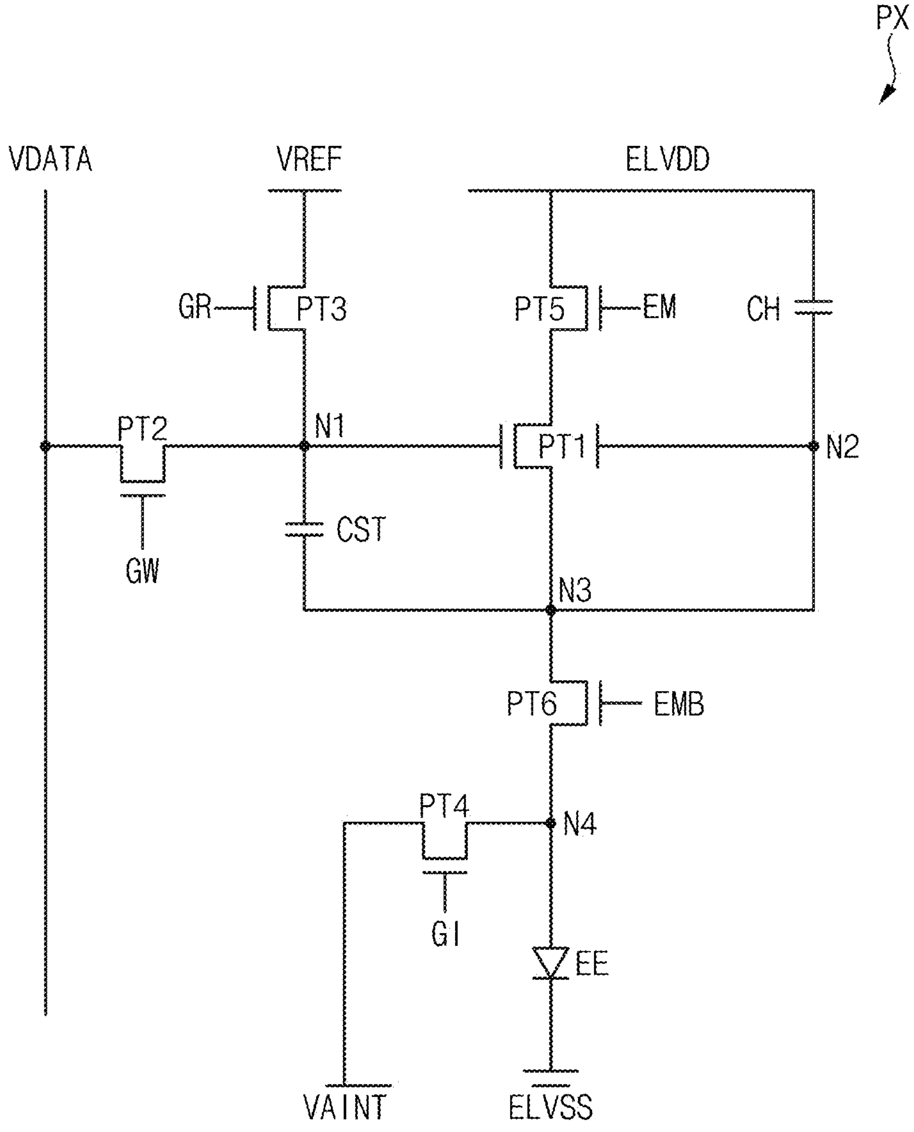
FIG. 2 is a circuit diagram illustrating a pixel included in the display panel of FIG. 1.

FIG. 2 is a circuit diagram illustrating a pixel included in the display panel of FIG. 1.

Referring to FIG. 2, a pixel PX may include a pixel circuit and a light-emitting element EE. The pixel circuit may include a first pixel transistor PT1, a second pixel transistor PT2, a third pixel transistor PT3, a fourth pixel transistor PT4, a fifth pixel transistor PT5, a sixth pixel transistor PT6, a storage capacitor CST, and a holding capacitor CH. The pixel circuit may provide a driving current to the light-emitting element EE, and the light-emitting element EE may generate light based on the driving current.

The first pixel transistor PT1 may include an upper gate electrode connected to a first node N1, a lower gate electrode connected to a second node N2, a first electrode to which a first power voltage ELVDD is applied, and a second electrode connected to a third node N3. The first pixel transistor PT1 may generate a current (e.g., the driving current) based on a voltage between the first node N1 and the third node N3, for example, a voltage stored in the storage capacitor CST. The first pixel transistor PT1 may be referred to as a driving transistor for generating the driving current. The first pixel transistor PT1 may provide the driving current to the light-emitting element EE.

In one or more embodiments, the first pixel transistor PT1 may have a dual gate structure including the upper gate electrode connected to the first node N1 and the lower gate electrode connected to the second node N2. However, a structure of the first pixel transistor PT1 according to one or more embodiments of the present disclosure may not be necessarily limited thereto, and the first pixel transistor PT1 may have a structure having one gate electrode.

The second pixel transistor PT2 may include a gate electrode that receives a write signal GW, a first electrode connected to a data voltage line, and a second electrode connected to the first node N1. Accordingly, the second pixel transistor PT2 may be turned on or off (e.g., activated or deactivated) by the write signal GW. For example, the second pixel transistor PT2 may apply a data voltage VDATA provided from the data voltage line to the first node N1 in response to the write signal GW. The second pixel transistor PT2 may be referred to as a write transistor or a scan transistor for transmitting the data voltage VDATA.

The third pixel transistor PT3 may include a gate electrode that receives a reference signal GR, a first electrode to which a reference voltage VREF is applied, and a second electrode connected to the first node N1. Accordingly, the third pixel transistor PT3 may be turned on or off by the reference signal GR. For example, the third pixel transistor PT3 may apply the reference voltage VREF to the first node N1 in response to the reference signal GR. The third pixel transistor PT3 may be referred to as a reference transistor or a reset transistor for applying the reference voltage VREF to the first node N1.

The fourth pixel transistor PT4 may include a gate electrode that receives an initialization signal GI, a first electrode to which an initialization voltage VAINT is applied, and a second electrode connected to a fourth node N4. Accordingly, the fourth pixel transistor PT4 may be turned on or off by the initialization signal GI. For example, the fourth pixel transistor PT4 may apply the initialization voltage VAINT to the fourth node N4 in response to the initialization signal GI. The fourth pixel transistor PT4 may be referred to as an initialization transistor for initializing the fourth node N4.

The fifth pixel transistor PT5 may include a gate electrode receiving the first light-emitting signal EM, a first electrode receiving the first power voltage ELVDD, and a second electrode connected to the first electrode of the first pixel transistor PT1. Accordingly, the fifth pixel transistor PT5 may be turned on or off by the first light-emitting EM. For example, during the period in which the fifth pixel transistor PT5 is turned on, the fifth pixel transistor PT5 may provide the first power voltage ELVDD to the first pixel transistor PT1. The fifth pixel transistor PT5 may be referred to as a light-emitting transistor or an operation control transistor for providing (e.g., forming) a current path of the first pixel transistor PT1 from a power voltage line to which the first power voltage ELVDD is applied.

The sixth pixel transistor PT6 may include a gate electrode that receives the second light-emitting signal EMB, a first electrode connected to the third node N3, and a second electrode connected to the fourth node N4. Accordingly, the sixth pixel transistor PT6 may be turned on or off by the second light-emitting signal EMB. For example, during the period in which the sixth pixel transistor PT6 is turned on, the sixth pixel transistor PT6 may provide the driving current to the light-emitting element EE. The sixth transistor T6 may be referred to as a light-emitting control transistor that controls the driving current provided to the pixel EE.

The storage capacitor CST may include a first electrode connected to the first node N1 and a second electrode connected to the third node N3. The storage capacitor CST may store the data voltage VDATA transmitted through the second pixel transistor PT2.

The holding capacitor CH may include a first electrode that receives the first power voltage ELVDD and a second electrode connected to the second node N2. In one or more embodiments, the second electrode of the holding capacitor CH may be connected to the lower gate electrode of the first pixel transistor PT1. The holding capacitor CH may be a capacitor for maintaining the voltage of the third node N3.

The light-emitting element EE may include a first terminal (e.g., an anode terminal) and a second terminal (e.g., a cathode terminal). The first terminal of the light-emitting element EE is connected to the fifth pixel transistor PT5 and the sixth pixel transistor PT6, and the second terminal may receive a second power voltage ELVSS. The light-emitting element EE may generate light having a brightness corresponding to the driving current. In one or more embodiments, the second power voltage ELVSS may have a different voltage level from the first power voltage ELVDD. For example, a voltage level of the second power voltage ELVSS may be less than a voltage level of the first power voltage ELVDD. However, a relationship between the voltage levels of the first power voltage ELVDD and the second power voltage ELVSS according to one or more embodiments of the present disclosure may not necessarily be limited thereto.

In one or more embodiments, each of the first, second, third, fourth, fifth, and sixth pixel transistors PT1, PT2, PT3, PT4, PT5, and PT6 may be an N-Channel Metal-Oxide-Semiconductor (NMOS) transistor. However, types of each of the first, second, third, fourth, fifth, and sixth pixel transistors PT1, PT2, PT3, PT4, PT5, and PT6 according to one or more embodiments of the present disclosure may not necessarily be limited thereto, and at least one transistor among the first, second, third, fourth, fifth, and/or sixth pixel transistors PT1, PT2, PT3, PT4, PT5, and/or PT6 may be a P-Channel Metal-Oxide-Semiconductor (PMOS) transistor.

In FIG. 2, a number of transistors included in one pixel PX is illustrated as 6, and a number of capacitors is illustrated as 2, but number of transistors and capacitors included in one pixel PX according to one or more embodiments of the present disclosure may not be necessarily limited thereto. For example, one pixel PX may include 5 or less, 7 or more transistors, or one pixel PX may include 1 capacitor or 3 or more capacitors.

Figure 3:
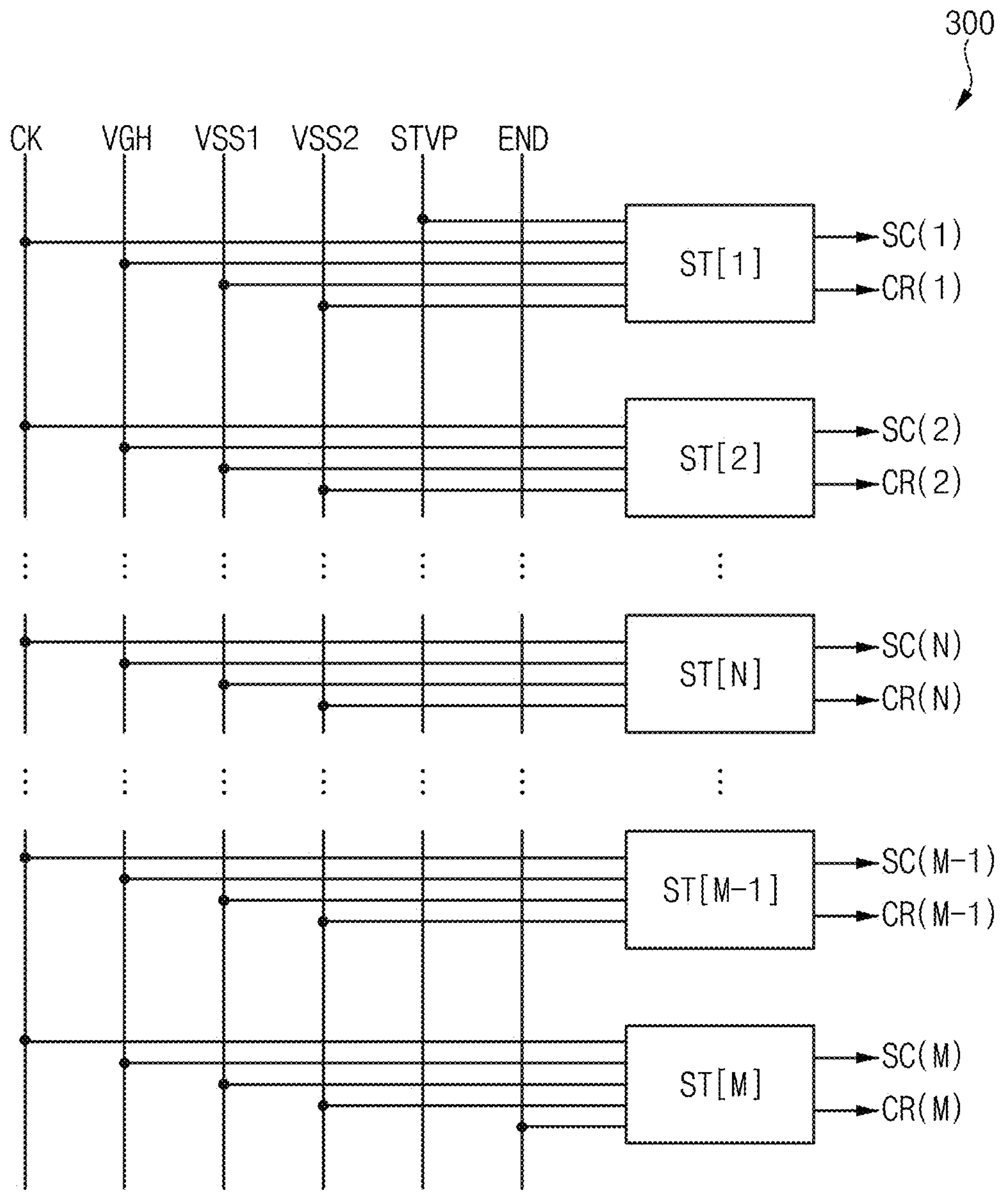
FIG. 3 is a block diagram illustrating a gate driver of FIG. 1.

FIG. 3 is a block diagram illustrating a gate driver of FIG. 1.

Referring to FIG. 3, the gate driver 300 may include a plurality of gate drivers (or a plurality of stages) ST[1], ST[2], . . . , ST[N], . . . , ST[M−1], and ST[M]. For example, N may be a natural number greater than or equal to 3, and M may be a natural number greater than n.

In one or more embodiments, a first gate driver ST[1] of the gate driver 300 may output a first output signal corresponding to a first gate line. In addition, a second gate driver ST[2] of the gate driver 300 may output a second output signal corresponding to a second gate line. In addition, an Nth gate driver ST[N] of the gate driver 300 may output an Nth output signal corresponding to an Nth gate line. In addition, an M−1th gate driver ST[M−1] of the gate driver 300 may output an M−1th output signal corresponding to an M−1th gate line. In addition, an Mth gate driver ST[M] of the gate driver 300 may output an Mth output signal corresponding to an Mth gate line. For example, the first gate driver ST[1] may be a gate driver located in the first stage, and the Mth gate driver ST[M] may be a gate driver located in a last stage (e.g., the Mth stage). In addition, the Nth gate driver may be a gate driver of a current stage (e.g., the Nth stage) located between the first gate driver ST[1] and the Mth gate driver ST[M].

A clock terminal CK providing a clock signal, a high gate voltage VGH of a high level, a first low voltage VSS1 of a low level, and a second low voltage VSS2 of a low level may be applied to each of the plurality of gate drivers ST[1], ST[2], . . . , ST[N], . . . , ST[M−1], and ST[M]. A vertical start signal STVP may be applied to the first gate driver among the plurality of gate drivers ST[1], ST[2], . . . , ST[N], . . . , ST[M−1], and ST[M]. A scan end signal END may be applied to the Mth gate driver among the plurality of gate drivers ST[1], ST[2], . . . , ST[N], . . . , ST[M−1], and ST[M]. In the present disclosure, the first low voltage VSS1 may be referred to as a low voltage.

Each of the plurality of gate drivers ST[1], ST[2], . . . , ST[N], . . . , ST[M−1], and ST[M] may output an output signal including a gate output signal and a carry signal. For example, a first output signal output from the first driving circuit ST[1] may include a first gate output signal SC(1) and a first carry signal CR(1). For example, a second output signal output from the second driving circuit ST[2] may include a second gate output signal SC(2) and a second carry signal CR(2). For example, the Nth output signal output from the Nth driving circuit ST[N] may include an Nth gate output signal SC(N) and an Nth carry signal CR(N). For example, the M−1th output signal output from the M−1th driving circuit ST[M−1] may include an M−1th gate output signal SC(M−1) and an M−1th carry signal CR(M−1). For example, an Mth output signal output from the Mth driving circuit ST[M] may include an Mth gate output signal SC(M) and an Mth carry signal CR(M).

Referring further to FIG. 2, in one or more embodiments, the gate output signal may include at least one of the write signal GW, the reference signal GR, the initialization signal GI, the first light-emitting signal EM, and/or the second light-emitting signal EMB. For example, the gate output signal may include all of the write signal GW, the reference signal GR, the initialization signal GI, the first light-emitting signal EM, and the second light-emitting signal EMB. However, types of signals included in the gate output signal of the present disclosure may not be necessarily limited thereto.

Figure 4:
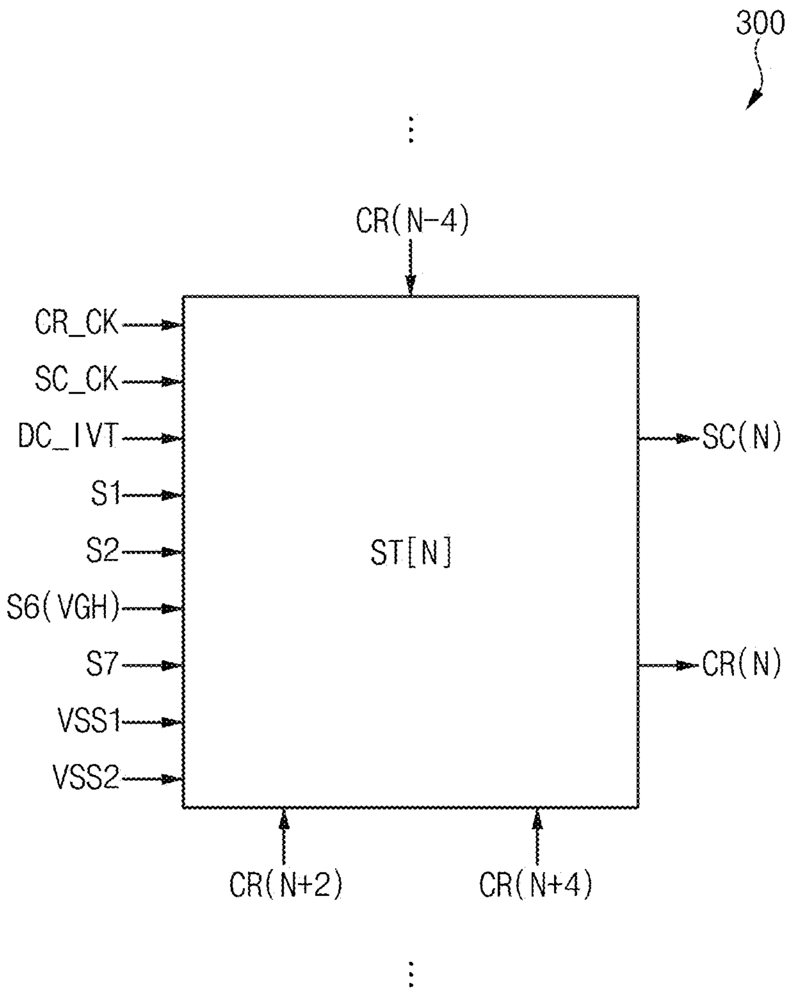
FIG. 4 is a block diagram illustrating an Nth gate driver of FIG. 3.
Figure 5:
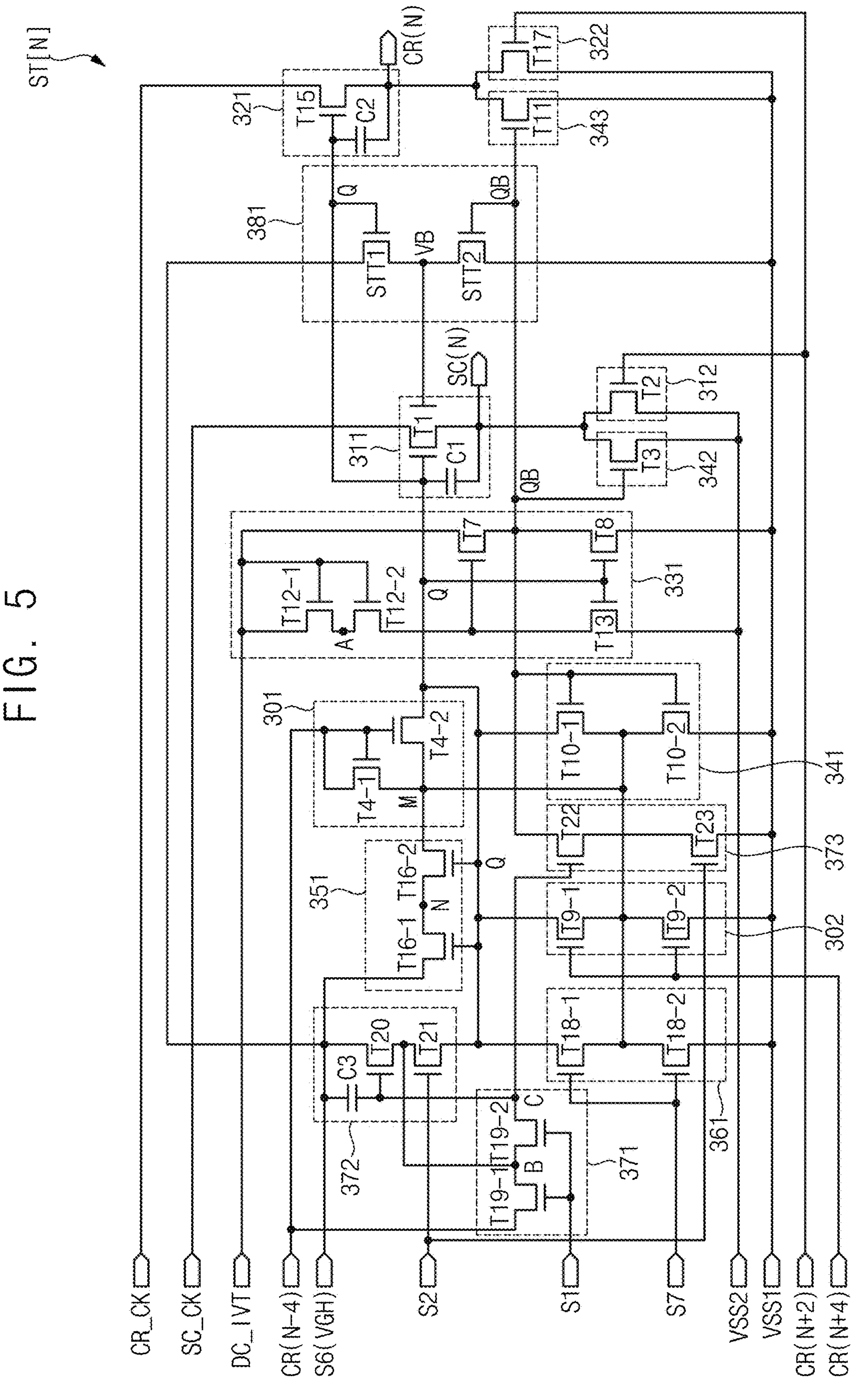
FIG. 5 is a circuit diagram illustrating an example of the Nth gate driver of FIG. 4.
Figure 6:
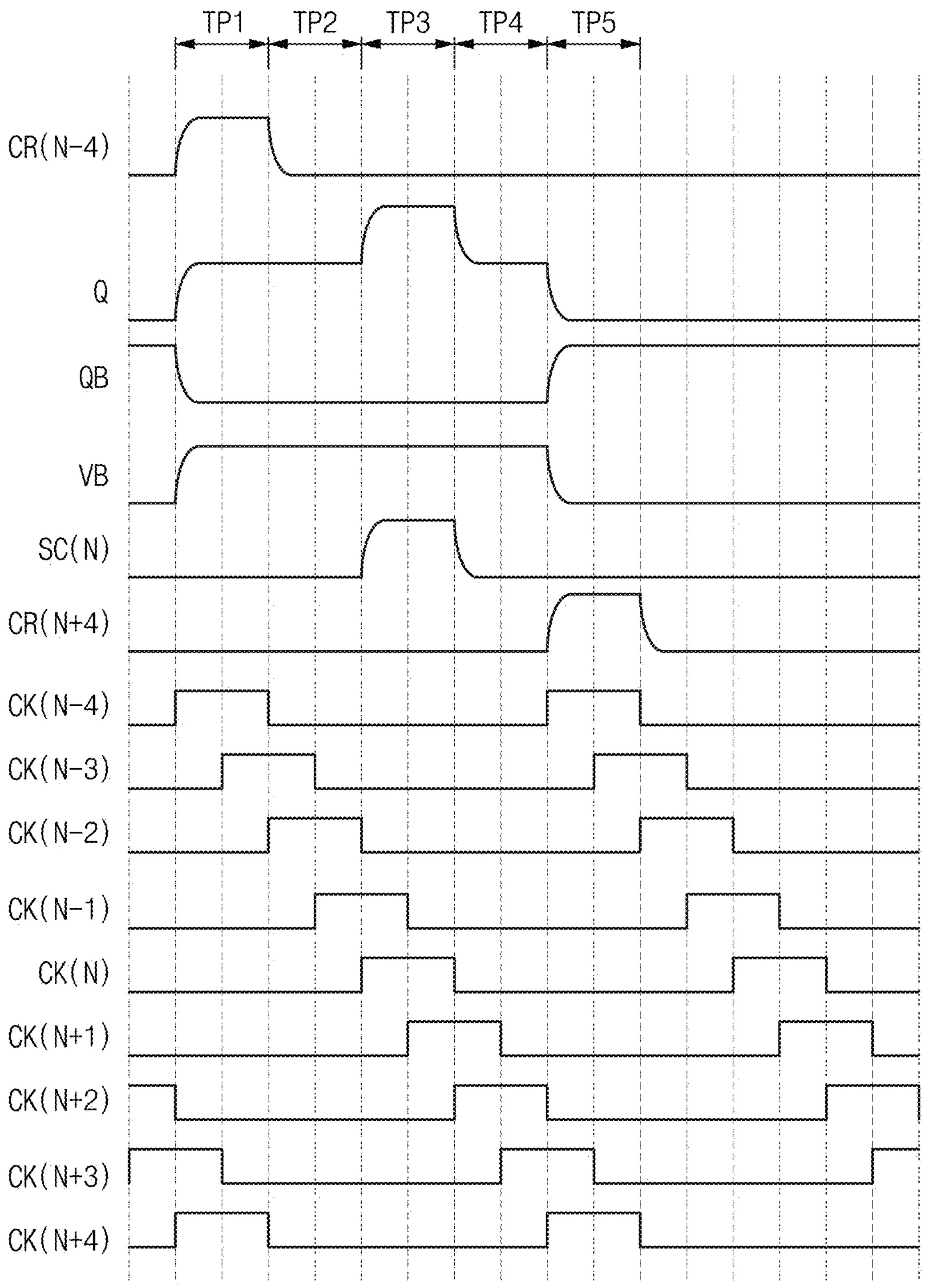
FIG. 6 is a timing chart illustrating input signals, node signals, and output signals of the Nth gate driver of FIG. 5.

FIG. 4 is a block diagram illustrating an Nth gate driver of FIG. 3. FIG. 5 is a circuit diagram illustrating an example of the Nth gate driver of FIG. 4. FIG. 6 is a timing chart illustrating input signals, node signals, and output signals of the Nth gate driver of FIG. 5.

Referring to FIGS. 3, 4, and 5, in one or more embodiments, a previous carry signal included in output signals output from the gate drivers of a previous stage may be applied to the Nth gate driver among the plurality of gate drivers ST[1], ST[2], . . . , ST[N], . . . , ST[M−1], and ST[M]. For example, the Nth gate driver may receive an N−4th carry signal CR(N−4) output from an N−4th gate driver. In one or more embodiments, a next carry signal included in output signals output from the gate drivers of a next stage may be applied to the Nth gate driver. For example, the Nth gate driver may receive an N+2th carry signal CR(N+2) output from an N+2th driving circuit and an N+4th carry signal CR(N+4) output from an N+4th driving circuit. In the present disclosure, the gate drivers of the previous stage may be referred to as previous gate drivers. In addition, in the present disclosure, based on the Nth gate driver ST[N], the N−4th carry signal CR(N−4) may be referred to as a previous carry signal.

In one or more embodiments, clock signals provided from a clock terminal CK may be applied to the Nth gate driver ST[N]. For example, the clock signals may include an N−4th clock signal CK(N−4), an N−3th clock signal CK(N−3), an N−2th clock signal CK(N−2), an N−1th clock signal CK (N−1), an Nth clock signal CK(N), an N+1th clock signal CK(N+1), an N+2th clock signal CK(N+2), and an N+3th clock signal CK(N+3). For example, an N−4th clock signal CK(N−4), an N−3th clock signal CK(N−3), an N−2th clock signal CK(N−2), an N−1th clock signal CK(N−1), an Nth clock signal CK(N), an N+1th clock signal CK(N+1), an N+2th clock signal CK(N+2), and an N+3th clock signal CK(N+3) may be applied to the Nth gate driver ST[N]. The clock signals may be any one of a carry clock signal CR_CK and/or a gate clock signal SC_CK.

In one or more embodiments, in the Nth gate driver ST[N], each of the N−4th clock signal CK(N−4), the N−3th clock signal CK(N−3), the N−2th clock signal CK(N−2), the N−1th clock signal CK(N−1), the Nth clock signal CK(N), the N+1th clock signal CK(N+1), the N+2th clock signal CK(N+2), and the N+3th clock signal CK(N+3) may have different phases. The N+4th clock signal CK(N+4) is illustrated for convenience of explanation and may be substantially the same signal as the N−4th clock signal CK(N−4).

In one or more embodiments, each of a first signal DC_IVT, a first sensing signal S1, a second sensing signal S2, a first high voltage (e.g., a high gate voltage VGH), a reset signal S7, a first low voltage VSS1, and a second low voltage VSS2 may be applied to the Nth gate driver ST[N]. In one or more embodiments, the Nth gate driver ST[N] may output an Nth carry signal CR(N) and an Nth gate output signal SC(N), respectively, based on input signals.

The Nth gate driver ST[N] may include a first pull-up control circuit 301, a second pull-up control circuit 302, a buffer circuit 311, a pull-down circuit 312, a carry pull-up circuit 321, a carry pull-down circuit 322, an inverting circuit 331, a first holding circuit 341, a second holding circuit 342, a third holding circuit 343, an intermediate node control circuit 351, a reset circuit 361, a sensing selection circuit 371, a first sensing control circuit 372, a second sensing control circuit 373, and/or a stabilization circuit 381.

The first pull-up control circuit 301 may apply the N−4th carry signal CR(N−4) to a pull-up control node Q in response to the N−4th carry signal CR(N−4), which is one signal among the carry signals output from the gate drivers of the previous stage. For example, the N−4th carry signal CR(N−4) may be a carry signal output from the N−4th gate driver.

In one or more embodiments, the first pull-up control circuit 301 may include a 4-1th transistor T4-1 and a 4-2th transistor T4-2. The 4-1th transistor T4-1 may include a gate electrode to which the N−4th carry signal CR(N−4) is applied, a first electrode to which the N−4th carry signal CR(N−4) is applied, and a second electrode connected to a first intermediate node M and opposite to the first electrode. The 4-2th transistor T4-2 may include a gate electrode to which the N−4th carry signal CR(N−4) is applied, a first electrode connected to the pull-up control node Q, and a second electrode connected to the first intermediate node M. In the disclosure, the 4-1th transistor T4-1 may be referred to as a first pull-up control transistor. In the disclosure, the 4-2th transistor T4-2 may be referred to as a second pull-up control transistor or a pull-up control transistor.

The first pull-up control circuit 301 according to one or more embodiments of the present disclosure may be illustrated as including two of the 4-1th and 4-2th transistors T4-1 and T4-2 connected in series to prevent or reduce leakage, but the present disclosure may not necessarily be limited thereto, and the first pull-up control circuit 301 may include one transistor or three or more transistors connected in series.

The second pull-up control circuit 302 may apply a first low voltage VSS1 to the pull-up control node Q in response to the N+4th carry signal CR(N+4), which is one signal among the carry signals output by the gate drivers of the next stage. For example, the N+4th carry signal (CR(N+4)) may be a carry signal output from the N+4th gate driver.

In one or more embodiments, the second pull-up control circuit 302 may include a 9-1th transistor T9-1 and a 9-2th transistor T9-2. The 9-1th transistor T9-1 may include a gate electrode to which the N+4th carry signal CR(N+4) is applied, a first electrode connected to the pull-up control node Q, and a second electrode connected to the first intermediate node M. The 9-2th transistor T9-2 may include a gate electrode to which the N+4th carry signal CR(N+4) is applied, a first electrode connected to the first intermediate node M, and a second electrode to which the first low voltage VSS1 is applied.

The second pull-up control circuit 302 according to one or more embodiments of the present disclosure may be illustrated as including two of the 9-1th and 9-2th transistors T9-1, and T9-2 connected in series to prevent or reduce leakage, but the present disclosure may not be necessarily limited thereto, and the second pull-up control circuit 302 may include one transistor or three or more transistors connected in series.

The buffer circuit 311 may output the gate clock signal SC_CK as the Nth gate output signal SC(N) in response to the signal of the pull-up control node Q. For example, the buffer circuit 311 may include the first transistor T1 and the first capacitor C1. The first transistor T1 may include an upper gate electrode connected to a pull-up control node Q, a lower gate electrode connected to a stabilization node VB, a first electrode to which a gate clock signal SC_CK is applied, and a second electrode connected to a gate output node to which an Nth gate output signal SC(N) is output. The first capacitor C1 may include a first electrode connected to the pull-up control node Q and a second electrode connected to the gate output node. In one or more embodiments, the first transistor T1 may have a dual gate structure including an upper gate electrode connected to the pull-up control node Q and a lower gate electrode connected to the stabilization node VB. In the present disclosure, the first transistor T1 may be referred to as a buffer transistor.

The pull-down circuit 312 may output a second low voltage VSS2 as the Nth gate output signal SC(N) in response to an N+2th carry signal CR(N+2), which is one signal among the carry signals output by the gate drivers of the next stage. For example, the N+2th carry signal CR(N+2) may be a carry signal output from the N+2th gate driver.

In one or more embodiments, the pull-down circuit 312 may include a second transistor T2 including a gate electrode to which the N+2th carry signal CR(N+2) is applied, a first electrode connected to the gate output node, and a second electrode to which the second low voltage VSS2 is applied. In one or more embodiments, the second low voltage VSS2 may define a low level of the gate output signal SC(N). For example, the second low voltage VSS2 may be about-5V. However, a magnitude of the second low voltage VSS2 according to one or more embodiments of the present disclosure may not be necessarily limited thereto.

The carry pull-up circuit 321 may output the carry clock signal CR_CK as the Nth carry signal CR(N) in response to the pull-up control node Q. In one or more embodiments, the carry pull-up circuit 321 may include a fifteenth transistor T15 and a second capacitor C2. The fifteenth transistor T15 may include a gate electrode connected to a pull-up control node Q, a first electrode to which a carry clock signal CR_CK is applied, and a second electrode connected to a carry output node from which an Nth carry signal CR(N) is output. The second capacitor C2 may include a first electrode connected to the pull-up control node Q and a second electrode connected to the carry output node.

The carry pull-down circuit 322 may output a first low voltage VSS1 to the Nth carry signal CR(N) in response to an N+2th carry signal CR(N+2). In one or more embodiments, the carry pull-down circuit 322 may include a seventeenth transistor T17 including a gate electrode to which the N+2th carry signal CR(N+2) is applied, a first electrode connected to the carry output node, and a second electrode to which the first low voltage VSS1 is applied.

The inverting circuit 331 may output one of the DC inverter voltage DC_IVT and the first low voltage VSS1 to the pull-down control node QB in response to a signal of the DC inverter voltage DC_IVT and the pull-up control node Q. The inverting circuit 331 may include a seventh transistor T7, an eighth transistor T8, a 12-1th transistor T12-1, a 12-2th transistor T12-2, and a thirteenth transistor T13.

In one or more embodiments, the seventh transistor T7 may include a gate electrode connected to the 12-2th transistor T12-2, a first electrode to which the DC inverter voltage DC_IVT is applied, and a second electrode connected to the pull-down control node QB.

The eighth transistor T8 may include a gate electrode connected to the pull-up control node Q, a first electrode connected to the pull-down control node QB, and a second electrode to which the first low voltage VSS1 is applied.

In one or more embodiments, the 12-1th transistor T12-1 may include a gate electrode to which the DC inverter voltage DC_IVT is applied, a first electrode to which the DC inverter voltage DC_IVT is applied, and a second electrode connected to a third intermediate node A.

In one or more embodiments, the 12-2th transistor T12-2 may include a gate electrode to which the DC inverter voltage DC_IVT is applied, a first electrode connected to the third intermediate node A, and a second electrode connected to the gate electrode of the seventh transistor T7.

In one or more embodiments, the thirteenth transistor T13 may include a gate electrode connected to the pull-up control node Q, a first electrode connected to the gate electrode of the seventh transistor T7, and a second electrode to which the second low voltage VSS2 is applied.

The inverting circuit 331 according to one or more embodiments of the present disclosure may be illustrated as including two of the 12-1th and 12-2th transistors T12-1 and T12-2 connected in series to prevent or reduce leakage, but the present disclosure may not necessarily be limited thereto, and the inverting circuit 331 may include one transistor or three or more transistors connected in series.

In one or more embodiments, the first low voltage VSS1 may be less than the second low voltage VSS2. For example, the first low voltage VSS1 may be about-9V. However, the magnitude of the first low voltage VSS1 according to one or more embodiments of the present disclosure may not be necessarily limited thereto.

In one or more embodiments, the DC inverter voltage DC_IVT may be less than a high gate voltage VGH defining a high level of the gate output signal SC(N). In one or more embodiments, the DC inverter voltage DC_IVT may be greater than the first low voltage VSS1 and the second low voltage VSS2.

The first holding circuit 341 may apply the first low voltage VSS1 to the pull-up control node Q in response to a signal of the pull-down control node QB. In one or more embodiments, the first holding circuit 341 may include a 10-1th transistor T10-1 and a 10-2th transistor T10-2. The 10-1th transistor T10-1 may include a gate electrode connected to the pull-down control node QB, a first electrode connected to the pull-up control node Q, and a second electrode connected to the first intermediate node M. The 10-2th transistor T10-2 may include a gate electrode connected to the pull-down control node QB, a first electrode connected to the first intermediate node M, and a second electrode to which a first low voltage VSS1 is applied.

The first holding circuit 341 according to one or more embodiments of the present disclosure may be illustrated as including two of 10-1th and 10-2th transistors (T10-1, T10-2) connected in series for leakage prevention or reduction, but the present disclosure may not be necessarily limited thereto, and the first holding circuit 341 may include one transistor or three or more transistors connected in series.

The second holding circuit 342 may output the second low voltage VSS2 as the Nth gate output signal SC(N) in response to the signal of the pull-down control node QB. In one or more embodiments, the second holding circuit 342 may include a third transistor T3 including a gate electrode connected to the pull-down control node QB, a first electrode connected to the gate output node, and a second electrode to which the second low voltage VSS2 is applied. The third holding circuit 343 may output the first low voltage VSS1 as the Nth carry signal CR(N) in response to a signal of the pull-down control node QB.

In one or more embodiments, the third holding circuit 343 may include an eleventh transistor T11 including a gate electrode connected to the pull-down control node QB, a first electrode connected to the carry output node, and a second electrode to which the first low voltage VSS1 is applied.

The intermediate node control circuit 351 may apply a high gate voltage S6(VGH) (e.g., the high gate voltage VGH of FIG. 3) to the first intermediate node M in response to a signal of the pull-up control node Q. In one or more embodiments, the intermediate node control circuit 351 may include a 16-1th transistor T16-1 and a 16-2th transistor T16-2. The 16-1th transistor T16-1 may include a gate electrode connected to a pull-up control node Q, a first electrode to which a high gate voltage S6(VGH) is applied, and a second electrode connected to a second intermediate node N. The 16-2th transistor T16-2 may include a gate electrode connected to the pull-up control node Q, a first electrode connected to the second intermediate node N, and a second electrode connected to the first intermediate node M.

The reset circuit 361 may apply the first low voltage VSS1 to the pull-up control node Q in response to a reset signal S7. In one or more embodiments, the reset circuit 361 may include an 18-1th transistor T18-1 and an 18-2th transistor T18-2. The 18-1th transistor T18-1 may include a gate electrode to which the reset signal $7 is applied, a first electrode connected to a pull-up control node Q, and a second electrode connected to a first intermediate node M. The 18-2th transistor T18-2 may include a gate electrode to which the reset signal S7 is applied, a first electrode connected to the first intermediate node M, and a second electrode to which the first low voltage VSS1 is applied.

The reset circuit 361 according to one or more embodiments of the present disclosure may be illustrated as including two of the 18-1th and 18-2th transistors T18-1, and T18-2 connected in series to prevent or reduce leakage, but the present disclosure may not be necessarily limited thereto, and the reset circuit 361 may include one transistor or three or more transistors connected in series.

For example, the reset signal S7 may be a signal having an activation pulse at the beginning of a display section. For example, the reset signal S7 may be a vertical start signal (e.g., the vertical start signal STVP of FIG. 3). For example, if (e.g., when) the reset signal S7 has an activation level at a starting of the display section, the pull-up control node Q may be reset to the first low voltage VSS1 by the reset circuit 361.

The sensing selection circuit 371 may apply the N−4th carry signal CR(N−4) to a sensing control node C in response to the first sensing signal S1. In one or more embodiments, the sensing selection circuit 371 may include a 19-1th transistor T19-1 and a 19-2th transistor T19-2. The 19-1th transistor T19-1 may include a gate electrode to which the first sensing signal S1 is applied, a first electrode to which the N−4th carry signal CR(N−4) is applied, and a second electrode connected to the fourth intermediate node B. The 19-2th transistor T19-2 may include a gate electrode to which the first sensing signal S1 is applied, a first electrode connected to the fourth intermediate node B, and a second electrode connected to the sensing control node C.

The sensing selection circuit 371 according to one or more embodiments of the present disclosure may be illustrated as including two of the 19-1th and 19-2th transistors T19-1 and T19-2 connected in series to prevent or reduce leakage, but the present disclosure may not be necessarily limited thereto, and the sensing selection circuit 371 may include one transistor or three or more transistors connected in series.

The first sensing control circuit 372 may apply a high gate voltage S6(VGH) defining a high level of the Nth gate output signal SC(N) to the pull-up control node Q in response to the signal of the sensing control node C and the second sensing signal S2. In one or more embodiments, the first sensing control circuit 372 may include a twentieth transistor T20, a twenty-first transistor T21, and a third capacitor C3.

The twentieth transistor T20 may include a gate electrode connected to the sensing control node C, a first electrode to which the high gate voltage S6(VGH) is applied, and a second electrode connected to the fourth intermediate node B. The twenty-first transistor T21 may include a gate electrode to which the second sensing signal S2 is applied, a first electrode connected to the fourth intermediate node B, and a second electrode connected to the pull-up control node Q. The third capacitor C3 may include a first electrode to which a high gate voltage S6(VGH) is applied and a second electrode connected to the sensing control node C.

The second sensing control circuit 373 may apply the first low voltage VSS1 to the pull-down control node QB in response to a signal of the sensing control node C and a second sensing signal S2. In one or more embodiments, the second sensing control circuit 373 may include a twenty-second transistor T22 and a twenty-third transistor T23. The twenty-second transistor T22 may include a gate electrode connected to the sensing control node C, a first electrode connected to the pull-down control node QB, and a second electrode connected to the twenty-third transistor T23. The twenty-third transistor T23 may include a gate electrode to which a second sensing signal S2 is applied, a first electrode connected to the second electrode of the twenty-second transistor T22, and a second electrode to which the first low voltage VSS1 is applied.

The stabilization circuit 381 may apply a high gate voltage S6(VGH) to the stabilization node VB in response to a pull-up control node Q, or may apply a first low voltage VSS1 to the stabilization node VB in response to a pull-down control node QB. In one or more embodiments, the stabilization circuit 381 may include a first stabilization transistor STT1 and a second stabilization transistor STT2.

The first stabilization transistor STT1 may include a gate electrode connected to a pull-up control node Q, a first electrode connected to a stabilization node VB, and a second electrode to which a high gate voltage S6(VGH) is applied and which is opposite to the first electrode of the first stabilization transistor STT1. The second stabilization transistor STT2 may include a gate electrode connected to a pull-down control node QB, a first electrode connected to the stabilization node VB, and a second electrode to which the first low voltage VSS1 is applied and which is opposite to the first electrode of the second stabilization transistor STT2.

A structure of the Nth gate driver ST[N] may be illustrated in FIGS. 4 and 5, the structure of the Nth gate driver ST[N] may have a structure substantially the same as or similar to a structure of the first gate driver ST[1], a structure of the Mth gate driver ST[M], and a structure of each of the gate drivers located between the first gate driver ST[1] and the Mth gate driver ST[M].

Referring to FIGS. 3, 4, 5, and 6, time period in which signals are applied may include a first time period TP1, a second time period TP2, a third time period TP3, a fourth time period TP4, and a fifth time period TP5. Each of the first time period TP1, the second time period TP2, the third time period TP3, the fourth time period TP4, and the fifth time period TP5 may be a time period divided to explain the driving or operation of the Nth gate driver ST[N] according to an application of the signals. In one or more embodiments, the first period TP1, the second period TP2, the third period TP3, the fourth period TP4, and the fifth period TP5 may be continuous.

As described above, the Nth clock signal CK(N−4), the Nth clock signal CK(N−3), the Nth clock signal CK(N−2), the Nth clock signal CK(N−1), the Nth clock signal CK(N), the N+1th clock signal CK(N+1), the N+2th clock signal CK(N+2), and the N+3th clock signal CK(N+3) may be applied to the Nth gate driver ST[N].

In the first period TP1, the Nth clock signal CK(N−4) may have a high level (e.g., the high gate voltage VGH). In the first time period TP1, the pull-up control node Q may have a high level (e.g., the high gate voltage VGH). In the first time period TP1, the pull-down control node QB may have a low level. In the first time period TP1, the stabilization node VB may have a high level (e.g., the high gate voltage VGH). The Nth clock signal CK(N) may be a carry clock signal CR_CK, and in the first time period TP1, the Nth clock signal CK(N) may have a low level.

In the first time period TP1, the first stabilization transistor STT1 may be turned on, and the stabilization node VB may have the high level. For example, in the first time period TP1, the first stabilization transistor STT1 may apply the high gate voltage S6(VGH) to the stabilization node VB in response to the pull-up control node Q.

In the second time period TP2, the N−4th clock signal CK(N−4) may have a low level. In the second time period TP2, the pull-up control node Q may have the high level. In the second time period TP2, the pull-down control node QB may have the low level. In the second time period TP2, the stabilization node VB may have the high level. The Nth clock signal CK(N) may be the carry clock signal CR_CK, and in the second time period TP2, the Nth clock signal CK(N) may have the low level.

In the second time period TP2, the first stabilization transistor STT1 is turned on, and the stabilization node VB may have the high level. For example, the first stabilization transistor STT1 turned on in the first time period TP1 maintains a turned-on state in the second time period TP2, and in the second time period TP2, the first stabilization transistor STT1 may apply the high gate voltage S6(VGH) to the stabilization node VB in response to the pull-up control node Q.

In the third time period TP3, the N−4th clock signal CK(N−4) may have the low level. In the third time period TP3, the pull-up control node Q may have an improved maximum voltage level (e.g., a voltage level twice the high gate voltage VGH, 2VGH). In the third time period TP3, the pull-down control node QB may have the low level. In the third time period TP3, the stabilization node VB may have the high level. The Nth clock signal CK(N) is a carry clock signal CR_CK, and in the third period TP3, the Nth clock signal CK(N) may have a high level (e.g., high gate voltage VGH).

As the buffer circuit 311 outputs the Nth gate output signal SC(N) of a high level (e.g., high gate voltage VGH) in the third period TP3, a voltage level applied to the pull-up control node Q may be relatively greater in the third period TP3 than in the second period TP2. For example, in the third time period TP3, as the first terminal of the first capacitor C1 is connected to the pull-up control node Q and the second terminal of the first capacitor C1 is connected to the gate output node from which the Nth gate output signal SC(N) is output, a voltage level applied to the pull-up control node Q may increase in response to the output of the Nth gate output signal SC(N).

In one or more embodiments, in the third time period TP3, while the voltage level of the pull-up control node Q increases to have an improved maximum voltage level, a voltage level applied to the stabilization node VB may be maintained at a constant level (e.g., the high level).

In the fourth time period TP4, the N−4th clock signal Q may have the low level. In the fourth time period TP4, the pull-up control node Q may have the high level (e.g., the high gate voltage VGH). In the fourth time period TP4, the pull-down control node QB may have the low level. In the fourth time period TP4, the stabilization node VB may have the high level. The Nth clock signal CK(N) is a carry clock signal CR_CK, and in the fourth time period TP4, the Nth clock signal CK(N) may have the low level.

In the fourth time period TP4, the first stabilization transistor STT1 is turned on, and the stabilization node VB may have the high level. For example, the first stabilization transistor STT1 turned on in the first period TP1 maintains a turned-on state during the second period TP2, the third period TP3, and the fourth period TP4, and in the fourth period TP4, the first stabilization transistor STT1 may apply the high gate voltage S6(VGH) to the stabilization node VB in response to the pull-up control node Q.

In the fifth period TP5, the N−4th clock signal (CK(N−4)) may have the low level. In the fifth period TP5, the pull-up control node Q may have a low level. In the fifth period TP5, the pull-down control node QB may have a high level (e.g., the high gate voltage (VGH)). In the fifth period TP5, the stabilization node VB may have a low level. The Nth clock signal CK(N) is a carry clock signal CR_CK, and in the fifth period TP5, the Nth clock signal CK(N) may have the low level.

In the fifth period TP5, the second stabilization transistor STT2 is turned on, and the stabilization node VB may have the low level. For example, in the fifth period TP5, the second stabilization transistor STT2 may apply the first low level VSS1 to the stabilization node VB in response to the pull-down control node QB.

In one or more embodiments, during the first period TP1, the second period TP2, the third period TP3, and the fourth period TP4, the first stabilization transistor STT1 may be turned on, and the second stabilization transistor STT2 may be turned off. In one or more embodiments, in the fifth time period TP5, the first stabilization transistor STT1 may be turned off and the second stabilization transistor STT2 may be turned on.

For example, during a period in which the first stabilization transistor STT1 is turned on, a high-level voltage may be applied to the stabilization node VB connected to the lower gate electrode of the first transistor T1 through the first stabilization transistor STT1. In addition, during the section in which the second stabilization transistor STT2 is turned on, a low-level voltage may be applied to the stabilization node VB connected to the lower gate electrode of the first transistor T1 through the second stabilization transistor STT2.

In one or more embodiments, the first electrode of the first transistor T1 to which the gate clock signal SC_CK is applied and the lower gate electrode of the first transistor T1 connected to the stabilization node VB may be separated from each other. In addition, even if the first transistor T1 has a structure in which the first electrode and the lower gate electrode are separated from each other, a high level voltage (e.g., the high gate voltage VGH) may be applied to the stabilization node VB through the first stabilization transistor STT1, and a low level voltage (e.g., the first low level VSS1) may be applied to the stabilization node VB through the second stabilization transistor STT2. Accordingly, the coupling phenomenon generated at the lower gate electrode of the first transistor T1 may be reduced by the first transistor T1 transmitted to the first electrode.

Figure 7:
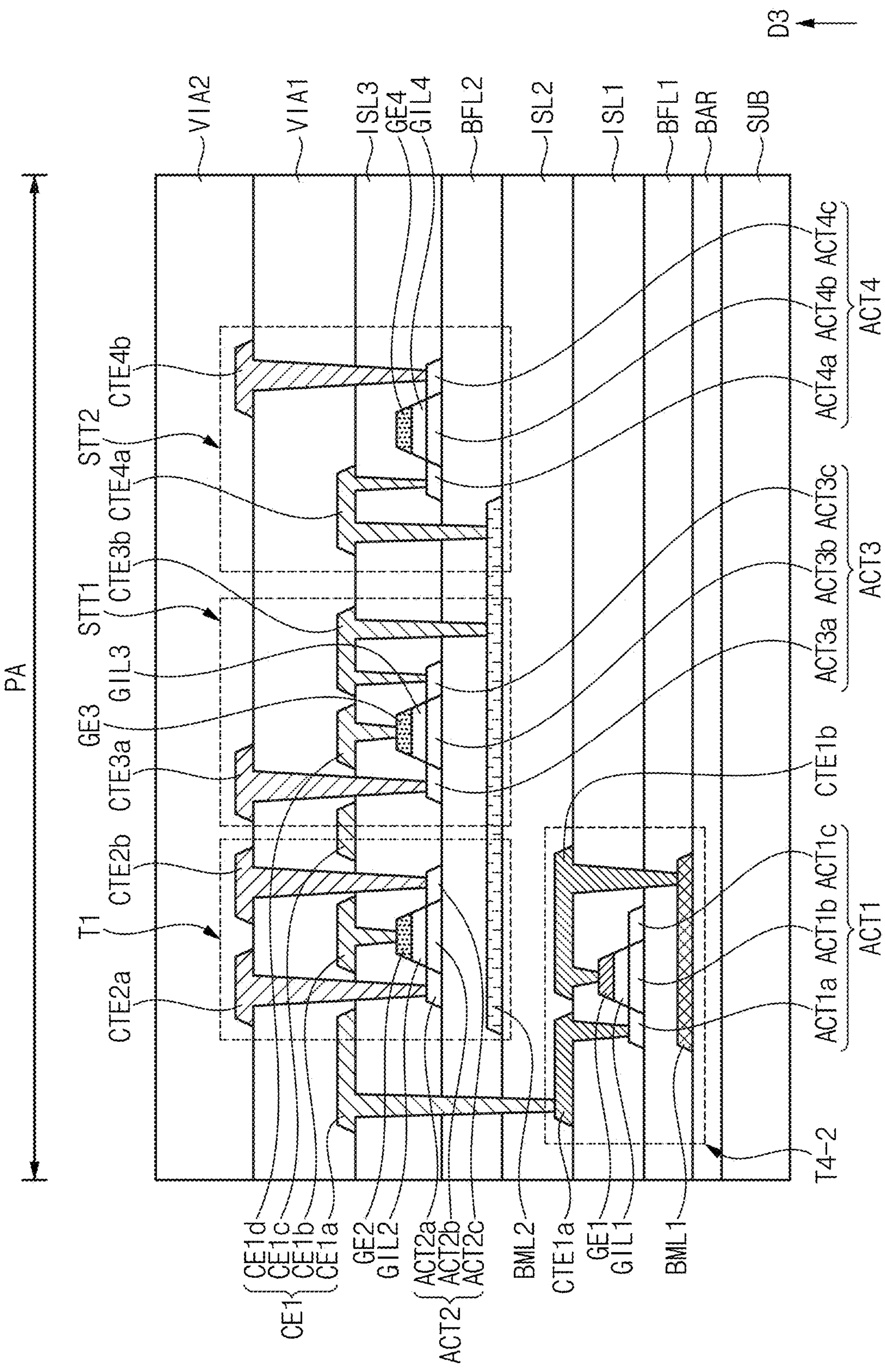
FIG. 7 is a cross-sectional view illustrating a portion of the Nth gate driver of FIG. 5.

FIG. 7 is a cross-sectional view illustrating a portion of the Nth gate driver of FIG. 5. For example, FIG. 7 is a cross-sectional view illustrating a cross-section taken along a line crossing the first transistor T1, the 4-2th transistor T4-2, the first stabilization transistor STT1, and the second stabilization transistor STT2 included in the gate driver (300) of FIG. 1.

Referring to FIGS. 1, 4, and 7, the gate driver 300 in the peripheral area PA of the display panel 100 may include substrate SUB, a barrier layer BAR, the 4-1th transistor T4-1, a first buffer layer BFL1, a first gate insulating layer GIL1, a first insulating layer ISL1, a second insulating layer ISL2, the first transistor T1, the first stabilization transistor STT1, the second stabilization transistor STT2, a second buffer layer BFL2, a second gate insulating layer GIL2, a third gate insulating layer GIL3, a fourth gate insulating layer GIL4, a third insulating layer ISL3, a first connection electrode CE1, a first via insulating layer VIA1, and a second via insulating layer VIA2.

The 4-2th transistor T4-2 may include a first active pattern ACT1, a first gate electrode GE1, a 1-1th contact electrode CTE1*a*, and a 1-2th contact electrode CTE1*b*. The first transistor T1 may include a second active pattern ACT2, a second gate electrode GE2, a 2-1th contact electrode CTE2*a*, and a 2-2th contact electrode CTE2*b*. The first stabilizing transistor STT1 may include a third active pattern ACT3, a third gate electrode GE3, a 3-1th contact electrode CTE3*a*, and a 3-2th contact electrode CTE3*b*. The second stabilizing transistor STT2 may include a fourth active pattern ACT4, a 4-1th contact electrode CTE4*a*, and a 4-2th contact electrode CTE4*b*.

The substrate SUB may provide a base of the display panel 100. The substrate SUB may include a transparent material and/or an opaque material. The substrate SUB may include a transparent resin substrate. For example, transparent resin substrate may include a polyimide substrate, and/or the like. In the case that the substrate SUB is the polyimide substrate transparent resin, the polyimide substrate may include a first organic layer, a first barrier layer, a second organic layer, and/or the like. In one or more embodiments, the substrate SUB may include a quartz substrate, a synthetic quartz substrate, a calcium fluoride substrate, a non-alkali glass substrate, and/or the like. These may be used alone or in combination with each other.

The barrier layer BAR may be above (e.g., disposed on) the substrate SUB. The barrier layer BAR may block impurities, such as oxygen, moisture, and/or the like, from diffusing to the upper portion of the substrate SUB through the substrate SUB. In addition, the barrier layer BAR may provide a flat upper surface on the upper side of the substrate SUB. In one or more embodiments, the barrier layer BAR may include an inorganic insulating material. For example, the inorganic insulating material may include a silicon nitride, a silicon oxide, a silicon oxynitride, and/or the like. These may be used alone or in combination with each other.

The first lower metal layer BML1 may be above the barrier layer BAR. The first lower metal layer BML1 may prevent or reduce diffusion of impurities into the first active pattern ACT1 or prevent or reduce static electricity generated in the 4-2th transistor T4-2. In one or more embodiments, the first lower metal layer BML1 may include a conductive material. For example, the conductive material may include molybdenum (Mo), copper (Cu), aluminum (Al), titanium (Ti), and/or the like. These may be used alone or in combination with each other.

The first buffer layer BFL1 may be above the first lower metal layer BML1. The first buffer layer BFL1 may block impurities, such as oxygen and moisture, from diffusing to the upper portion of the substrate SUB through the substrate SUB. In addition, the first buffer layer BFL1 may provide a flat upper surface on the upper portion of the substrate SUB. The first buffer layer BFL1 may include an inorganic insulating material.

The first active pattern ACT1 may be above the first buffer layer BFL1. In one or more embodiments, the first active pattern ACT1 may include an oxide semiconductor. For example, the oxide semiconductor may include indium (In), gallium (Ga), tin (Sn), zirconium (Zr), vanadium (V), hafnium (Hf), cadmium (Cd), germanium (Ge), chromium, titanium, zinc (Zn), and/or the like. These may be used alone or in combination with each other. However, the materials included in the first active pattern ACT1 according to one or more embodiments of the present disclosure may not be necessarily limited thereto, and the first active pattern ACT1 may include an organic semiconductor or a silicon semiconductor, and/or the like. For example, the silicon semiconductor may be polycrystalline silicon, amorphous silicon, and/or the like.

The first active pattern ACT1 may include a first conductive area ACT1*a*, a first channel area ACT1*b*, and a second conductive area ACT1*c*. Each of the first conductive area ACT1*a* and the second conductive area ACT1*c* may be an area doped with an impurity. In one or more embodiments, each of the first conductive area ACT1*a* and the second conductive area ACT1*c* may be doped with an N-type impurity. However, a material doped in each of the first conductive area ACT1*a* and the second conductive area ACT1*c* according to one or more embodiments of the present disclosure may not be necessarily limited thereto, and each of the first conductive area ACT1*a* and the second conductive area ACT1*c* may be doped with a P-type impurity.

The first channel area ACT1*b* may be located (e.g., disposed) between the first conductive area ACT1*a* and the second conductive area ACT1*c*. The first channel area ACT1*b* may be an area doped with an impurity at a relatively low concentration compared to the first conductive area ACT1*a* and the second conductive area ACT1*c*, or may be a non-doped area that is not doped with an impurity.

The first gate insulating layer GIL1 may be above the first active pattern ACT1. The first gate insulating layer GIL1 may cover at least a portion of the first active pattern ACT1. In one or more embodiments, the first gate insulating layer GIL1 may overlap the channel area ACT1*b* of the first active pattern ACT1 in a plan view. In one or more embodiments, the first gate insulating layer GIL1 may include an inorganic insulating material. The first gate insulating layer GIL1 may be illustrated as partially covering the first active pattern ACT1 in FIG. 7, however the present disclosure may not be necessarily limited thereto, and the first gate insulating layer GIL1 may entirely cover the first active pattern ACT1.

The first gate electrode GE1 may be above the first gate insulating layer GIL1. In one or more embodiments, the first gate electrode GE1 may overlap the first gate insulating layer GIL1 in a plan view. In one or more embodiments, the first gate electrode GE1 may overlap the channel area ACT1*b* of the first active pattern ACT1 in a plan view. In one or more embodiments, the first gate electrode GE1 may include a conductive material. The first gate electrode GE1 may be the gate electrode of the 4-2th transistor T4-2.

The first insulating layer ISL1 may be above the first gate electrode GE1. The first insulating layer ISL1 may cover each of the first active pattern ACT1 and the first gate electrode GE1. In one or more embodiments, the first insulating layer ISL1 may have a substantially flat upper surface. However, the first insulating layer ISL1 according to one or more embodiments of the present disclosure may not be necessarily limited thereto, and the first insulating layer ISL1 may have a substantially uniform thickness along the profile of the first gate electrode GE1. In one or more embodiments, the first insulating layer ISL1 may include an inorganic insulating material.

The 1-1th contact electrode CTE1*a* and the 1-2th contact electrode CTE1*b* may be above the first insulating layer ISL1. In one or more embodiments, each of the 1-1th contact electrode CTE1*a* and the 1-2th contact electrode CTE1*b* may include a conductive material.

In one or more embodiments, the 1-1th contact electrode CTE1*a* may contact the first active pattern ACT1. For example, the 1-1th contact electrode CTE1*a* may contact the first conductive area ACT1*a* of the first active pattern ACT1 through a contact hole (or contact opening) penetrating the first insulating layer ISL1 in a thickness direction (e.g., the third direction DR3).

In one or more embodiments, the 1-2th contact electrode CTE1*b* may contact each of the first gate electrode GE1 and the first lower metal layer BML1. For example, the 1-2th contact electrode CTE1*b* may contact the first gate electrode GE1 through a contact hole penetrating the first insulating layer ISL1 in the thickness direction. For example, the 1-2th contact electrode CTE1*b* may contact the first lower metal layer BML1 through a contact hole penetrating the first insulating layer ISL1 and the first buffer layer BFL1 in the thickness direction.

The 1-1th contact electrode CTE1*a* may be the first electrode of the 4-2th transistor T4-2. For example, the 1-1th contact electrode CTE1*a* may be a first electrode of the 4-2th transistor T4-2 connected to the pull-up control node Q and connected to the gate electrode of the first transistor T1 through the pull-up control node Q. The 1-2th contact electrode CTE1*b* may be a second electrode of the 4-2th transistor T4-2 connected to the first intermediate node M1.

In one or more embodiments, the 4-2th transistor T4-2 may be above the first lower metal layer BML1. In one or more embodiments, the 4-2th transistor T4-2 may be located (e.g., disposed) between the first lower metal layer BML1 and the second lower metal layer BML2 in a cross-sectional view. For example, each of the first active pattern ACT1 and the first gate electrode GE1 of the 4-2th transistor T4-2 may be located between the first lower metal layer BML1 and the second lower metal layer BML2.

The second insulating layer ISL2 may be above the 1-1th contact electrode CTE1*a* and the 1-2th contact electrode CTE1*b*. For example, the second insulating layer ISL2 may cover each of the 1-1th contact electrode CTE1*a* and the 1-2th contact electrode CTE1*b*. In one or more embodiments, the second insulating layer ISL2 may have a substantially flat upper surface. However, the second insulating layer ISL2 according to one or more embodiments of the present disclosure may not be necessarily limited thereto, and the second insulating layer ISL2 may have a substantially uniform thickness along the profile of the first gate electrode GE1. In one or more embodiments, the second insulating layer ISL2 may include an inorganic insulating material.

The second lower metal layer BML2 may be above the second insulating layer ISL2. The second lower metal layer BML2 may prevent or reduce diffusion of impurities into the first transistor T1, the first stabilization transistor STT1, and the second stabilization transistor STT2, or may prevent or reduce static electricity generated in the first transistor T1, the first stabilization transistor STT1, and the second stabilization transistor STT2. In one or more embodiments, the second lower metal layer BML2 may overlap each of the 1-1th contact electrode CTE1*a* and the 1-2th contact electrode CTE1*b* in a plan view. In one or more embodiments, the second lower metal layer BML2 may include substantially a same material as the first lower metal layer BML1. For example, the second lower metal layer BML2 may include a conductive material. The second lower metal layer BML2 may be a lower gate electrode of the first transistor T1.

The second buffer layer BFL2 may be above the second lower metal layer BML2. In one or more embodiments, the second buffer layer BFL2 may cover the second lower metal layer BML2. In one or more embodiments, the second buffer layer BFL2 may have a substantially flat upper surface. However, the second buffer layer BFL2 according to one or more embodiments of the present disclosure may not be necessarily limited thereto, and the second buffer layer BFL2 may have a substantially uniform thickness along the profile of the second lower metal layer BML2. In one or more embodiments, the second buffer layer BFL2 may include an inorganic insulating material.

The second active pattern ACT2, the third active pattern ACT3, and the fourth active pattern ACT4 may be above the second buffer layer BFL2. In one or more embodiments, each of the second active pattern ACT2, the third active pattern ACT3, and the fourth active pattern ACT4 may perform substantially the same function as the first active pattern ACT1. In one or more embodiments, each of the second active pattern ACT2, the third active pattern ACT3, and the fourth active pattern ACT4 may include substantially the same material as the first active pattern ACT1. For example, each of the second active pattern ACT2, the third active pattern ACT3, and the fourth active pattern ACT4 may include an oxide semiconductor. However, a material included in each of the second active pattern ACT2, the third active pattern ACT3, and the fourth active pattern ACT4 according to one or more embodiments of the present disclosure may not be necessarily limited thereto.

The second active pattern ACT2 may include a third conductive area ACT2*a*, a second channel area ACT2*b*, and a fourth conductive area ACT2*c*. Each of the third conductive area ACT2*a* and the fourth conductive area ACT2*c* of the second active pattern ACT2 may be doped with an N-type impurity. However, a material doped in each of the third conductive area ACT2*a* and the fourth conductive area ACT2*c* according to one or more embodiments of the present disclosure may not be necessarily limited thereto, and each of the third conductive area ACT2*a* and the fourth conductive area ACT2*c* may be doped with a P-type impurity.

The second channel area ACT2*b* may be arranged (e.g., disposed) between the third conductive area ACT2*a* and the fourth conductive area ACT2*c*. The second channel area ACT2*b* may be an area doped with an impurity at a relatively low concentration compared to the third conductive area ACT3*a* and the fourth conductive area ACT4*c*, or may be a non-doped area that is not doped with an impurity.

The third active pattern ACT3 may include a fifth conductive area ACT3*a*, a third channel area ACT3*b*, and a sixth conductive area ACT3*c*. The fourth active pattern ACT4 may include a seventh conductive area ACT4*a*, a fourth channel area ACT4*b*, and an eighth conductive area ACT4*c*. Each of the fifth conductive area ACT3*a* of the third active pattern ACT3 and the seventh conductive area ACT4*a* of the fourth active pattern ACT4 may be substantially the same as the third conductive area ACT2*a* of the second active pattern ACT2. Each of the sixth conductive area ACT3*c* of the third active pattern ACT3 and the eighth conductive area ACT4*c* of the fourth active pattern ACT4 may be substantially the same as the fourth conductive area ACT2*c* of the second active pattern ACT2. The third channel area ACT3*b* of the third active pattern ACT3 and the fourth channel area ACT4*b* of the fourth active pattern ACT4 may be substantially the same as the second channel area ACT2*b* of the second active pattern ACT2.

Each of the second active pattern ACT2, the third active pattern ACT3, and the fourth active pattern ACT4 may overlap the second metal layer BML2 in a plan view. For example, each of the second active pattern ACT2 and the third active pattern ACT3 may completely overlap the second metal layer BML2 in a plan view. For example, the fourth active pattern ACT4 may partially overlap the second metal layer BML2 in a plan view. However, the overlapping relationship between the second active pattern ACT2, the third active pattern ACT3, and the fourth active pattern ACT4 and the second metal layer BML2 in a plan view according to one or more embodiments of the present disclosure may not be necessarily limited thereto.

The second gate insulating layer GIL2 may be above the second active pattern ACT2. For example, the second gate insulating layer GIL2 may cover the second active pattern ACT2. The third gate insulating layer GIL3 may be above the third active pattern ACT3. For example, the third gate insulating layer GIL3 may cover the third active pattern ACT3. The fourth gate insulating layer GIL4 may be above the fourth active pattern ACT4. For example, the fourth gate insulating layer GIL4 may cover the fourth active pattern ACT4.

The second gate electrode GE2 may be above the second gate insulating layer GIL2. In one or more embodiments, the second gate electrode GE2 may overlap the second gate electrode GE2 in a plan view. The third gate electrode GE3 may be above the third gate insulating layer GIL3. In one or more embodiments, the third gate electrode GE3 may overlap the third gate electrode GE3 in a plan view. The fourth gate electrode GE4 may be above the fourth gate insulating layer GIL4. In one or more embodiments, the fourth gate electrode GE4 may overlap the fourth gate electrode GE4 in a plan view.

The second gate electrode GE2 may be the upper gate electrode of the first transistor T1. The third gate electrode GE3 may be the gate electrode of the first stabilization transistor STT1. The fourth gate electrode GE4 may be the gate electrode of the second stabilization transistor STT2.

The third insulating layer ISL3 may be above the second gate electrode GE2, the third gate electrode GE3, and the fourth gate electrode GE4. In one or more embodiments, the third insulating layer ISL3 may cover the second active pattern ACT2, the third active pattern ACT3, the fourth active pattern ACT4, the second gate electrode GE2, the third gate electrode GE3, and the fourth gate electrode GE4. In one or more embodiments, the third insulating layer ISL3 may have a substantially flat upper surface. However, the third insulating layer ISL3 according to one or more embodiments of the present disclosure may not be necessarily limited thereto, and the third insulating layer ISL3 may have a uniform thickness along the profiles of each of the second gate electrode GE2, the third gate electrode GE3, and the fourth gate electrode GE4. In one or more embodiments, the third insulating layer ISL3 may include an inorganic insulating material.

The first connection electrode CE1 may be above the third insulating layer ISL3. The first connection electrode CE1 may include a first portion CE1*a*, a second portion CE1*b*, a third portion CE1*c*, and a fourth portion CE1*d*. In one or more embodiments, the first connection electrode CE1 may be provided (e.g., formed) integrally with the first portion CE1*a*, the second portion CE1*b*, the third portion CE1*c*, and the fourth portion CE1*d*. For example, the first connection electrode CE1 may be illustrated as the first portion CE1*a*, the second portion CE1*b*, the third portion CE1*c*, and the fourth portion CE1*d* are separated from each other in a cross-sectional view, but in a plan view, the first portion CE1*a*, the second portion CE1*b*, the third portion CE1*c*, and the fourth portion CE1*d* of the first connection electrode CE1 may be provided integrally by being connected to each other. In the present disclosure, the first connection electrode CE1 may be referred to as a connection electrode.

In one or more embodiments, the first portion CE1*a* of the first connection electrode CE1 may contact the 1-1th contact electrode CTE1*a*. For example, the first portion CE1*a* of the first connection electrode CE1 may contact the 1-1th contact electrode CTE1*a* through a contact hole penetrating the second insulating layer ILS2, the second buffer layer BFL2, and the third insulating layer ISL3 in the thickness direction.

In one or more embodiments, the second portion CE1*b* of the first connection electrode CE1 may contact the second gate electrode GE2. The second portion CE1*b* of the first connection electrode CE1 may contact the second gate electrode GE2 through a contact hole penetrating the third insulating layer ISL3 in the thickness direction.

In one or more embodiments, the fourth portion CE1*d* of the first connection electrode CE1 may contact the third gate electrode GE3. The fourth portion CE1*d* of the first connection electrode CE1 may contact the third gate electrode GE3 through a contact hole penetrating the third insulating layer ISL3 in the thickness direction.

Because the first connection electrode CE1 contacts each of the 1-1th contact electrode CTE1*a*, the second gate electrode GE2, and the third gate electrode GE3, the second electrode of the 4-2th transistor T4-2, the gate electrode of the first transistor T1, and the gate electrode of the first stabilization transistor STT1 may be electrically connected to each other through the first connection electrode CE1. For example, the second electrode of the 4-2th transistor T4-2, the gate electrode of the first transistor T1, and the gate electrode of the first stabilization transistor STT1 may be connected to the pull-up control node Q through the first connection electrode CE1.

In one or more embodiments, the first connection electrode CE1 may be separated from (e.g., spaced apart from) the second lower metal layer BML2 in a cross-sectional view. In other words, the first connection electrode CE1 may not contact the second lower metal layer BML2.

The 3-2th contact electrode CTE3*b* may be above the third insulating layer ISL3. In one or more embodiments, the 3-2th contact electrode CTE3*b* may contact each of the sixth conducting area ACT3*c* of the third active pattern ACT3 and the second lower metal layer BML2. For example, the 3-2th contact electrode CTE3*b* may contact the sixth conductive area ACT3*c* of the third active pattern ACT3 through a contact hole penetrating the third insulating layer ISL3 in the thickness direction. For example, the 3-2th contact electrode CTE3*b* may contact the second lower metal layer BML2 through a contact hole penetrating the second buffer layer BFL2 and the third insulating layer ISL3 in the thickness direction. The 3-2th contact electrode CTE3*b* may be a first electrode of the first stabilization transistor STT1 connected to the stabilization node VB. Accordingly, the first electrode of the first stabilization transistor STT1 may be electrically connected to the lower gate electrode of the first transistor T1.

The 4-1th contact electrode CTE4*a* may be above the third insulating layer ISL3. In one or more embodiments, the 4-1th contact electrode CTE4*a* may contact each of the seventh conductive area ACT4*a* of the fourth active pattern ACT4 and the second lower metal layer BML2. For example, the 4-1th contact electrode CTE4*a* may contact the seventh conductive area ACT4*a* of the fourth active pattern ACT4 through a contact hole penetrating the third insulating layer ISL3 in the thickness direction. For example, the 4-1th contact electrode CTE4*a* may contact the second lower metal layer BML2 through a contact hole penetrating the second buffer layer BFL2 and the third insulating layer ISL3 in the thickness direction. The 4-1th contact electrode CTE4*a* may be a first electrode of the second stabilization transistor STT2 connected to the stabilization node VB. Accordingly, the first electrode of the second stabilization transistor STT2 may be electrically connected to the lower gate electrode of the first transistor T1.

In one or more embodiments, the third active pattern ACT3, the fourth active pattern ACT4, and the second lower metal layer BML2 may be electrically connected to each other. For example, the sixth conductive area ACT3*c*, the seventh conductive area ACT4*a*, and the second lower metal layer BML2 may be electrically connected to each other through the 3-2th contact electrode CTE3*b* and the 4-1th contact electrode CTE4*a*.

In one or more embodiments, the first connection electrode CE1, the 3-2th contact electrode CTE3*b*, and the 4-1th contact electrode CTE4*a* may be at a same layer. In one or more embodiments, the first connection electrode CE1, the 3-2th contact electrode CTE3*b*, and the 4-1th contact electrode CTE4*a* may be provided through substantially the same process.

The first via insulating layer VIA1 may be above the third insulating layer ISL3. In one or more embodiments, the first via insulating layer VIA1 may cover the first connection electrode CE1, the 3-2th contact electrode CTE3*b*, and the 4-1th contact electrode CTE4*a* on the third insulating layer ISL3. In one or more embodiments, the first via insulating layer VIA1 may include an organic insulation material such as polyimide or polyamide. In one or more embodiments, the first via insulating layer VIA1 may have a substantially flat upper surface.

The 2-1th contact electrode CTE2*a* and the 2-2th contact electrode CTE2*b* may be above the first via insulating layer VIA1. Each of the 2-1th contact electrode CTE2*a* and the 2-2th contact electrode CTE2*b* may contact the second active pattern ACT2. For example, the 2-1th contact electrode CTE2*a* may contact the third conductive area ACT2*a* of the second active pattern ACT2 through a contact hole penetrating the third insulating layer ISL3 and the first via insulating layer VIA1 in the thickness direction. For example, the 2-2th contact electrode CTE2*b* may contact the fourth conductive area ACT2*c* of the second active pattern ACT2 through a contact hole penetrating the third insulating layer ISL3 and the first via insulating layer VIA1 in the thickness direction.

The 2-1th contact electrode CTE2*a* may be the first electrode of the first transistor T1 to which the gate clock signal SC_CK is applied. The 2-2th contact electrode CTE2*b* may be a second electrode of the first transistor T1 connected to the gate output node from which the Nth gate output signal SC(N) is output.

The 3-1th contact electrode CTE3*a* may be above the first via insulating layer VIA1. In one or more embodiments, the 3-1th contact electrode CTE3*a* may contact the fifth conductive area ACT3*a* of the third active pattern ACT3. For example, the 3-1th contact electrode CTE3*a* may contact the fifth conductive area ACT3*a* of the third active pattern ACT3 through a contact hole penetrating the third insulating layer ISL3 and the first via insulating layer VIA1 in the thickness direction. The 3-1th contact electrode CTE3*a* may be the second electrode of the first stabilizing transistor STT1 to which the high gate voltage S6(VGH) is applied.

The 4-2th contact electrode CTE4*b* may be above the first via insulating layer VIA1. In one or more embodiments, the 4-2th contact electrode CTE4*b* may contact the eighth conductive area ACT4*b* of the fourth active pattern ACT4. For example, the 4-2th contact electrode CTE4*b* may contact the eighth conductive area ACT4*b* through a contact hole penetrating the third insulating layer ISL3 and the first via insulating layer VIA1 in the thickness direction. The 4-2th contact electrode CTE4*b* may be the second electrode of the second stabilizing transistor STT2 to which the first low voltage VSS1 is applied.

In one or more embodiments, the 2-1th contact electrode CTE2*a*, the 2-2th contact electrode CTE2*b*, the 3-1th contact electrode CTE3*a*, and the 4-2th contact electrode CTE4*b* may be at a same layer. In one or more embodiments, the 2-1th contact electrode CTE2*a*, the 2-2th contact electrode CTE2*b*, the 3-1th contact electrode CTE3*a*, and the 4-2th contact electrode CTE4*b* may be provided through substantially the same process.

In one or more embodiments, the first transistor T1 may be above the second lower metal layer BML2. In one or more embodiments, the first stabilizing transistor STT1 may be above the second lower metal layer BML2. In one or more embodiments, the second stabilizing transistor STT2 may be above the second lower metal layer BML2. For example, each of the second active pattern ACT2 and the second gate electrode GE2 of the first transistor T1 may be above the second lower metal layer BML2. Each of the third active pattern ACT3 and the third gate electrode GE3 of the first stabilizing transistor STT1 may be above the second lower metal layer BML2. Each of the fourth active pattern ACT4 and the fourth gate electrode GE4 of the second stabilizing transistor STT2 may be above the second lower metal layer BML2.

In one or more embodiments, the first transistor T1, the first stabilizing transistor STT1, and the second stabilizing transistor STT2 may be at a same layer. For example, the second active pattern ACT2 of the first transistor T1, the third active pattern ACT3 of the first stabilizing transistor STT1, and the fourth active pattern ACT4 of the second stabilizing transistor STT2 may be at a same layer. The second gate electrode GE2 of the first transistor T1, the third gate electrode GE3 of the first stabilization transistor STT1, and the fourth gate electrode GE4 of the second stabilization transistor STT2 may be at a same layer.

The second via insulating layer VIA2 may be above the first via insulating layer VIA1. In one or more embodiments, the second via insulating layer VIA2 may cover the 2-1th contact electrode CTE2*a*, the 2-2th contact electrode CTE2*b*, the 3-1th contact electrode CTE3*a*, and the 4-2th contact electrode CTE4*b*. In one or more embodiments, the second via insulating layer VIA2 may include an organic insulating material. In one or more embodiments, the second via insulating layer VIA2 may have a substantially flat upper surface.

As described above, in the gate driver (e.g., the Nth gate driver ST[N]) according to one or more embodiments of the present disclosure, each of the first stabilization transistor STT1 and the second stabilization transistor STT2 may be connected to the lower gate electrode of the first transistor T1. In addition, the first connection electrode CE1 may contact the upper gate electrode of the first transistor T1 and may not contact the second lower metal layer BML2 defining the lower gate electrode of the first transistor T1. Accordingly, a coupling phenomenon caused by the second lower metal layer BML2 and the first-second contact electrode CTE1*b* arranged under the second lower metal layer BML2 overlapping each other in a plan view may not be directly transmitted to the upper gate electrode of the first transistor T1 through the first connection electrode CE1. Accordingly, an instability generated by a fluctuation of the voltage of the upper gate electrode of the first transistor T1 may be reduced.

As described above, the display device 1 of FIG. 1 according to one or more embodiments of the present disclosure includes a gate driver 300 including the gate driver, so that the gate driver 300 may operate stably, and thus, the reliability of the display device 1 may be improved. In addition, because a portion of the 4-2th transistor T4-2 and a portion of the first transistor T1 overlap in a plan view, the peripheral area PA of the display panel 100 is reduced, so that a high-resolution display device 1 may be implemented.

Figure 8:
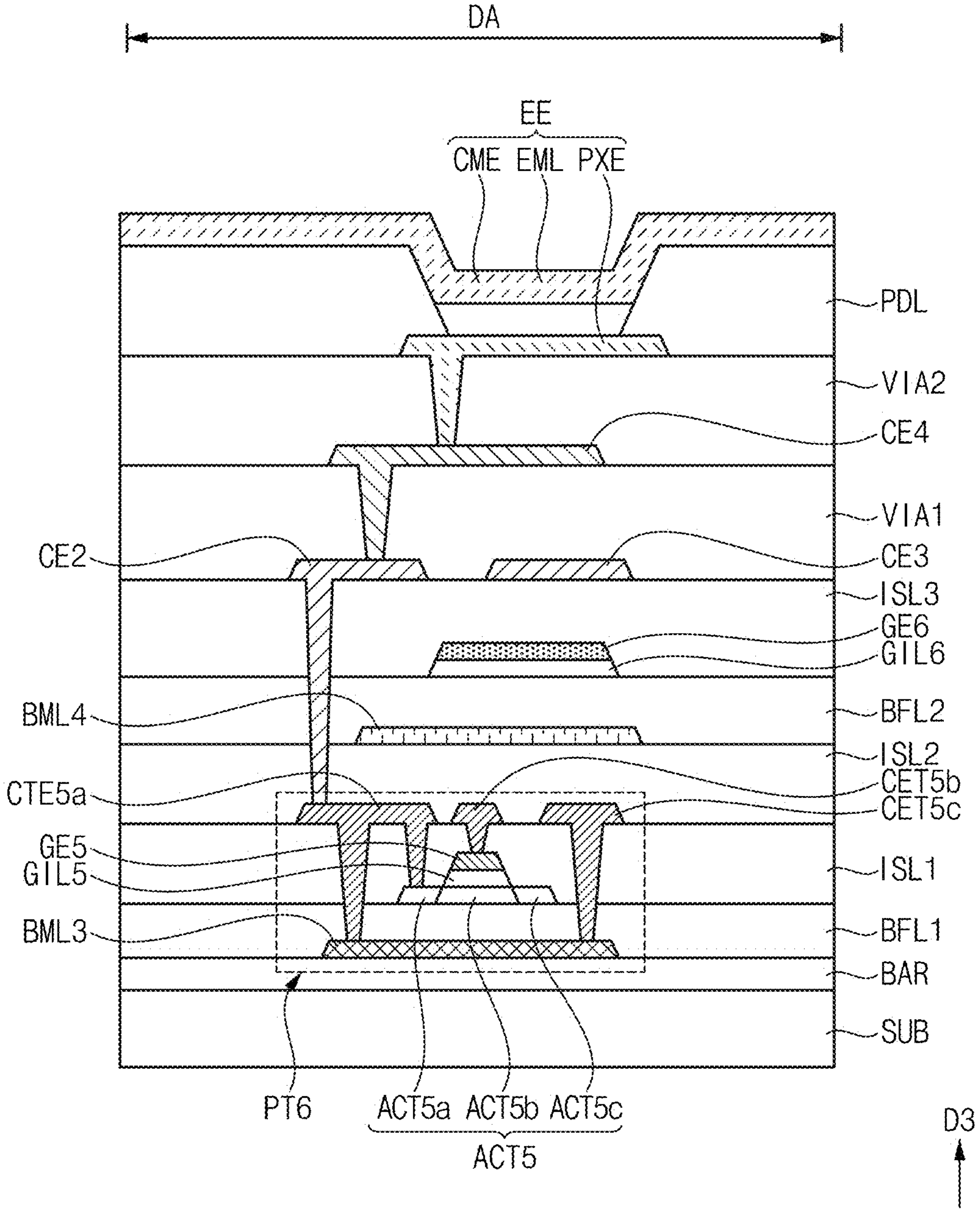
FIG. 8 is a cross-sectional view illustrating a portion of the display panel of FIG. 1.

FIG. 8 is a cross-sectional view illustrating a portion of the display panel of FIG. 1. For example, FIG. 8 is a cross-sectional view illustrating a cross-section of the pixel PX included in a display panel 100 of FIG. 1 taken along a line crossing the sixth pixel transistor PT6.

A stacking order and an arrangement relationship of the insulating layers and conductive layers described with reference to FIG. 8 may be substantially the same as or similar to a stacking order and an arrangement relationship of the insulating layers and metal layers described with reference to FIG. 7. Hereinafter, any content overlapping with the content described with reference to FIG. 7 may be omitted or briefly described.

Referring to FIGS. 1, 2, 7, and 8, the pixel PX in the display area DA of the display panel 100 may include the substrate SUB, the barrier layer BAR, the sixth pixel transistor PT6, the first buffer layer BFL1, a fifth gate insulating layer GIL5, the first insulating layer ISL1, the second insulating layer ISL2, the second buffer layer BFL2, a sixth gate insulating layer GIL6, a sixth gate electrode GE6, a second connection electrode CE2, the third insulating layer ISL3, a third connection electrode CE3, the first via insulating layer VIA1, a fourth connection electrode CE4, the second via insulating layer VIA2, a pixel defining layer PDL, and/or the light-emitting element EE.

The pixel transistor PT6 may include a third lower metal layer BML3, a fifth active pattern ACT5, a fifth gate electrode GE5, a 5-1th contact electrode CTE5*a*, a 5-2th contact electrode CTE5*b*, and a 5-3th contact electrode CTE5*c*. The light-emitting element EE may include a pixel electrode PXE, a light-emitting layer EML, and a common electrode CME.

The third lower metal layer BML3 may be above the barrier layer BAR. In one or more embodiments, the third lower metal layer BML3 may be at a same layer as the first lower metal layer BML1. In one or more embodiments, the third lower metal layer BML3 may include substantially the same material as the first lower metal layer BML1. In one or more embodiments, the third lower metal layer BML3 may be provided through substantially the same process as the first lower metal layer BML1.

The fifth active pattern ACT5 may be above the first buffer layer BFL1. In one or more embodiments, the fifth active pattern ACT5 may be at a same layer as the first active pattern ACT1. In one or more embodiments, the fifth active pattern ACT5 may include substantially the same material as the first active pattern ACT1. In one or more embodiments, the fifth active pattern ACT5 may be provided through a process substantially the same as that of the first active pattern ACT1.

The fifth active pattern ACT5 may include a ninth conductive area ACT5*a*, a fifth channel area ACT5*b*, and a tenth conductive area ACT5*c*. The ninth conductive area ACT5*a* and the tenth conductive area ACT5*c* may be doped with an N-type impurity. The fifth channel area ACT5*b* may be an area doped with an impurity at a relatively lower concentration than the ninth conductive area ACT5*a* and the tenth conductive area ACT5*c*, or may be a non-doped area that is not doped with an impurity. However, the material doped in each of the ninth conductive area (ACT5*a*) and the tenth conductive area ACT5*c* according to one or more embodiments of the present disclosure may not be necessarily limited thereto, and each of the ninth conductive area ACT5*a* and the tenth conductive area ACT5*c* may be doped with a P-type impurity.

The fifth gate insulating layer GIL5 may be above the fifth active pattern (ACT5). In one or more embodiments, the fifth gate insulating layer GIL5 may be at a same layer as the first gate insulating layer GIL1. In one or more embodiments, the fifth gate insulating layer GIL5 may include substantially the same material as the first gate insulating layer GIL1. In one or more embodiments, the fifth gate insulating layer GIL5 may be provided through substantially the same process as the first gate insulating layer GIL1.

The fifth gate electrode GE5 may be above the fifth gate insulating layer GIL5. In one or more embodiments, the fifth gate electrode GE5 may overlap the fifth active pattern ACT5 in a plan view. In one or more embodiments, the fifth gate electrode GE5 may be at a same layer as the first gate electrode GE1. In one or more embodiments, the fifth gate electrode GE5 may include the same material as the first gate electrode GE1. In one or more embodiments, the fifth gate electrode GE5 may be provided through substantially the same process as the first gate electrode GE1.

The 5-1th contact electrode CTE5*a*, the 5-2th contact electrode CTE6*b*, and the 5-3th contact electrode CTE5*c* may be above the first insulating layer ISL1. In one or more embodiments, the 5-1th contact electrode CTE5*a* may contact each of the ninth conductive area ACT5*a* and the third lower metal layer BML3. For example, the 5-1th contact electrode CTE5*a* may contact the ninth conductive area ACT5*a* through a contact hole penetrating the first insulating layer ISL1 in the thickness direction. For example, the 5-1th contact electrode CTE5*a* may contact the third lower metal layer BML3 through a contact hole penetrating the first buffer layer BFL1 and the first insulating layer ISL1 in the thickness direction.

In one or more embodiments, the 5-2th contact electrode CTE5*b* may contact the fifth gate electrode GE5. For example, the 5-2th contact electrode CTE5*b* may contact the fifth gate electrode GE5 through a contact hole penetrating the first insulating layer ISL1 in the thickness direction.

In one or more embodiments, the 5-3th contact electrode CTE5*c* may contact the tenth conductive area ACT5*c*. For example, the 5-3th contact electrode CTE5*c* may contact the tenth conductive area ACT5*c* through a contact hole penetrating the first insulating layer ISL1 in the thickness direction.

The 5-1th contact electrode CTE5*a* may be a first electrode of the sixth pixel transistor PT6 connected to the third node N3. The 5-3th contact electrode CTE5*c* may be a second electrode of the sixth pixel transistor PT6 connected to the fourth node N4.

The fourth lower metal layer BML4 may be above the second insulating layer ILS2. In one or more embodiments, the fourth lower metal layer BML4 may be at a same layer as the second lower metal layer BML2. In one or more embodiments, the fourth lower metal layer BML4 may include substantially the same material as the second lower metal layer BML2. In one or more embodiments, the fourth lower metal layer BML4 may be provided through substantially the same process as the second lower metal layer BML2.

The sixth gate insulating layer GIL6 may be above the second buffer layer BFL2. In one or more embodiments, the sixth gate insulating layer GIL6 may be at a same layer as the second gate insulating layer GIL2, the third gate insulating layer GIL3, and the fourth gate insulating layer GIL4. In one or more embodiments, the sixth gate insulating layer GIL6 may include substantially the same material as the second gate insulating layer GIL2, the third gate insulating layer GIL3, and the fourth gate insulating layer GIL4. In one or more embodiments, the sixth gate insulating layer GIL6 may be provided through substantially the same process as the second gate insulating layer GIL2, the third gate insulating layer GIL3, and the fourth gate insulating layer GIL4

The sixth gate electrode GE6 may be in a sixth gate insulating layer GIL6. In one or more embodiments, the sixth gate electrode GE6 may be at a same layer as the second gate electrode GE2, the third gate electrode GE3, and the fourth gate electrode GE4. In one or more embodiments, the sixth gate electrode GE6 may include substantially the same material as the second gate electrode GE2, the third gate electrode GE3, and the fourth gate electrode GE4. In one or more embodiments, the sixth gate electrode GE6 may be provided through substantially the same process as the second gate electrode GE2, the third gate electrode GE3, and the fourth gate electrode GE4.

The second connection electrode CE2 and the third connection electrode CE3 may be above the third insulating layer ISL3. In one or more embodiments, the second connection electrode CE2 may contact the 5-1th contact electrode CTE5*a* through a contact hole penetrating the second insulating layer ISL2, the second buffer layer BFL2 and the third insulating layer ISL3 in the thickness direction.

In one or more embodiments, the third connection electrode CE3 may be at a same layer as the first connection electrode CE1, the second connection electrode CE2, the 3-2th contact electrode CTE3*b*, and the 4-1th contact electrode CTE4*a*. In one or more embodiments, the third connection electrode CE3 may include substantially the same material as the first connection electrode CE1, the second connection electrode CE2, the 3-2th contact electrode CTE3*b*, and the 4-1th contact electrode CTE4*a*. In one or more embodiments, the third connection electrode CE3 may be provided through substantially the same process as the first connection electrode CE1, the second connection electrode CE2, the third-second contact electrode CTE3*b*, and the fourth-first contact electrode CTE4*a*.

The fourth connection electrode CE4 may be above the first via insulating layer VIA1. In one or more embodiments, the fourth connection electrode CE4 may contact the second connection electrode CE2 through a contact hole penetrating the first via insulating layer VIA1 in the thickness direction.

In one or more embodiments, the fourth connection electrode CE4 may be at a same layer as the 2-1th contact electrode CTE2*a*, the 2-2th contact electrode CTE2*b*, the 3-1th contact electrode CTE3*a*, and the 4-2th contact electrode CTE4*b*. In one or more embodiments, the fourth connection electrode CE4 may include substantially the same material as the 2-1th contact electrode CTE2*a*, the 2-2th contact electrode CTE2*b*, the 3-1th contact electrode CTE3*a*, and the 4-2th contact electrode CTE4*b*. In one or more embodiments, the fourth connection electrode CE4 may be provided through substantially the same process as the 2-1th contact electrode CTE2*a*, the 2-2th contact electrode CTE2*b*, the 3-1th contact electrode CTE3*a*, and the 4-2th contact electrode CTE4*b*.

The pixel electrode PXE may be above the second via insulating layer VIA2. The pixel electrode PXE may contact the fourth connection electrode CE4 through a contact hole penetrating the second via insulating layer VIA2 in the thickness direction. For example, the pixel electrode PXE may be electrically connected to the 5-1th contact electrode CTE5*a* through the second connection electrode CE2 and the fourth connection electrode CE4. In one or more embodiments, the pixel electrode PXE may include a conductive material such as a metal, an alloy, a transparent conductive oxide, and/or the like. For example, the pixel electrode PXE may include silver (Ag), indium tin oxide (ITO), and/or the like. In one or more embodiments, the pixel electrode PXE may have a multilayer structure including an indium tin oxide layer, a silver layer, and an indium tin oxide layer that are stacked in the third direction DR3. However, the structure of the pixel electrode PXE according to one or more embodiments of the present disclosure may not be limited thereto.

The pixel defining layer PDL may be above the second via insulating layer VIA2. A hole may be defined in the pixel defining layer PDL that penetrates the second via insulating layer VIA2 in the thickness direction and exposes the pixel electrode PXE. For example, the pixel defining layer PDL may cover an edge of the pixel electrode PXE and expose a center of the pixel electrode PXE through the hole. The pixel defining layer PDL may include an organic insulating material.

The light-emitting layer EML may be above the pixel electrode PXE. For example, the light-emitting layer EML may be above the pixel electrode PXE exposed by the hole of the pixel defining layer PDL. The light-emitting layer EML may include a light-emitting material. For example, the light-emitting material may include an organic light-emitting material, a quantum dot, and/or the like. These may be used alone or in combination with each other.

The common electrode CME may be above the light-emitting layer EML and the pixel defining layer PDL. The common electrode CME may include aluminum, platinum (Pt), silver, magnesium (Mg), gold (Au), chromium (Cr), tungsten (W), titanium, and/or the like. They may be used alone or in combination with each other.

The pixel electrode PXE may be the first terminal of the light-emitting element EE described with reference to FIG. 2, and the common electrode CME may be the second terminal of the light-emitting element EE described with reference to FIG. 2.

A stacked structure of the sixth pixel transistor PT6 is illustrated in FIG. 8, however a stacked structure of each of the first pixel transistor PT1, the second pixel transistor PT2, the third pixel transistor PT3, the fourth pixel transistor PT4, and the fifth pixel transistor PT5 included in one pixel PX may be substantially the same as or similar to the stacked structure of the sixth pixel transistor PT6.

Figure 9:
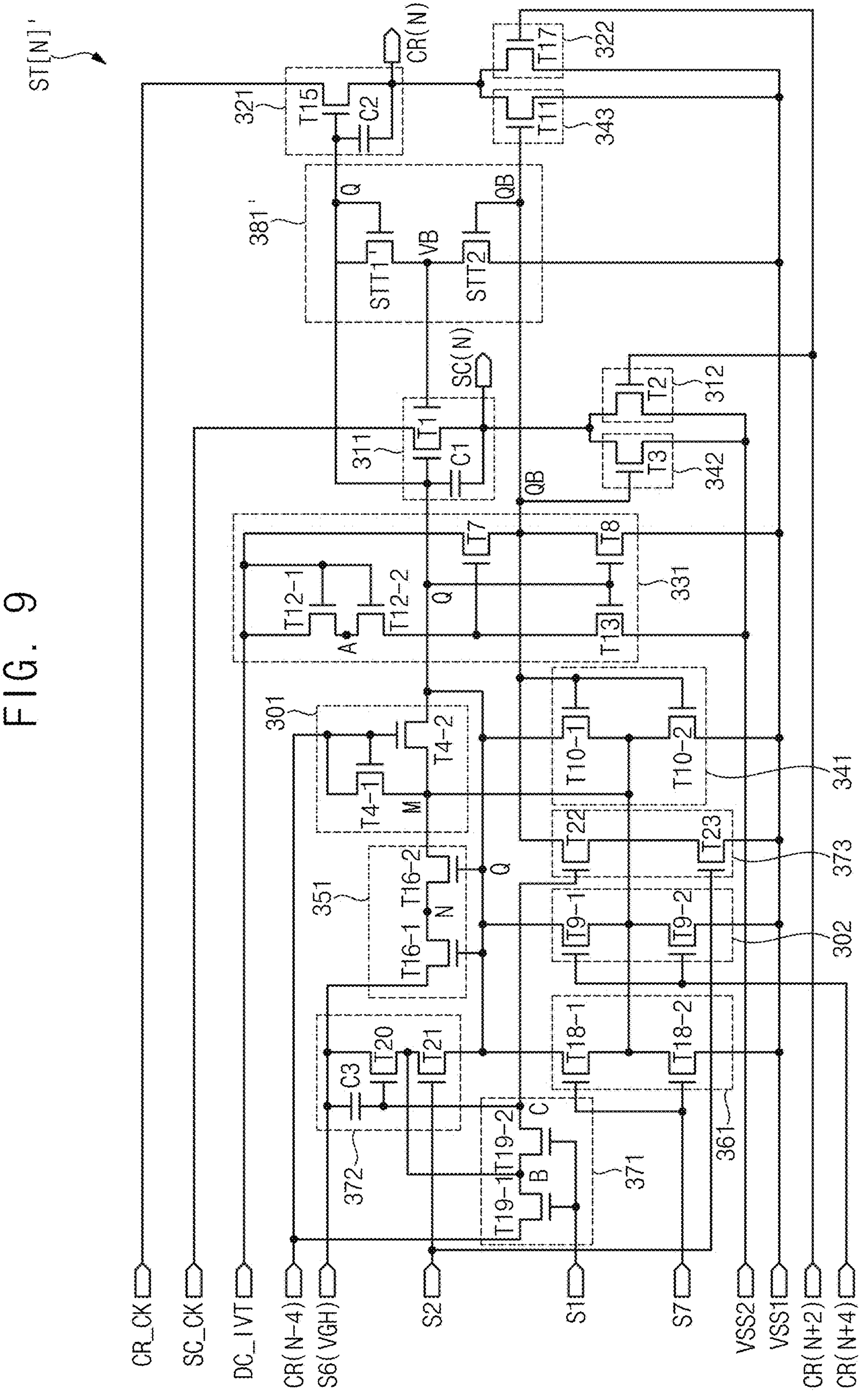
FIG. 9 is a circuit diagram illustrating another example of the Nth gate driver of FIG. 4.
Figure 10:
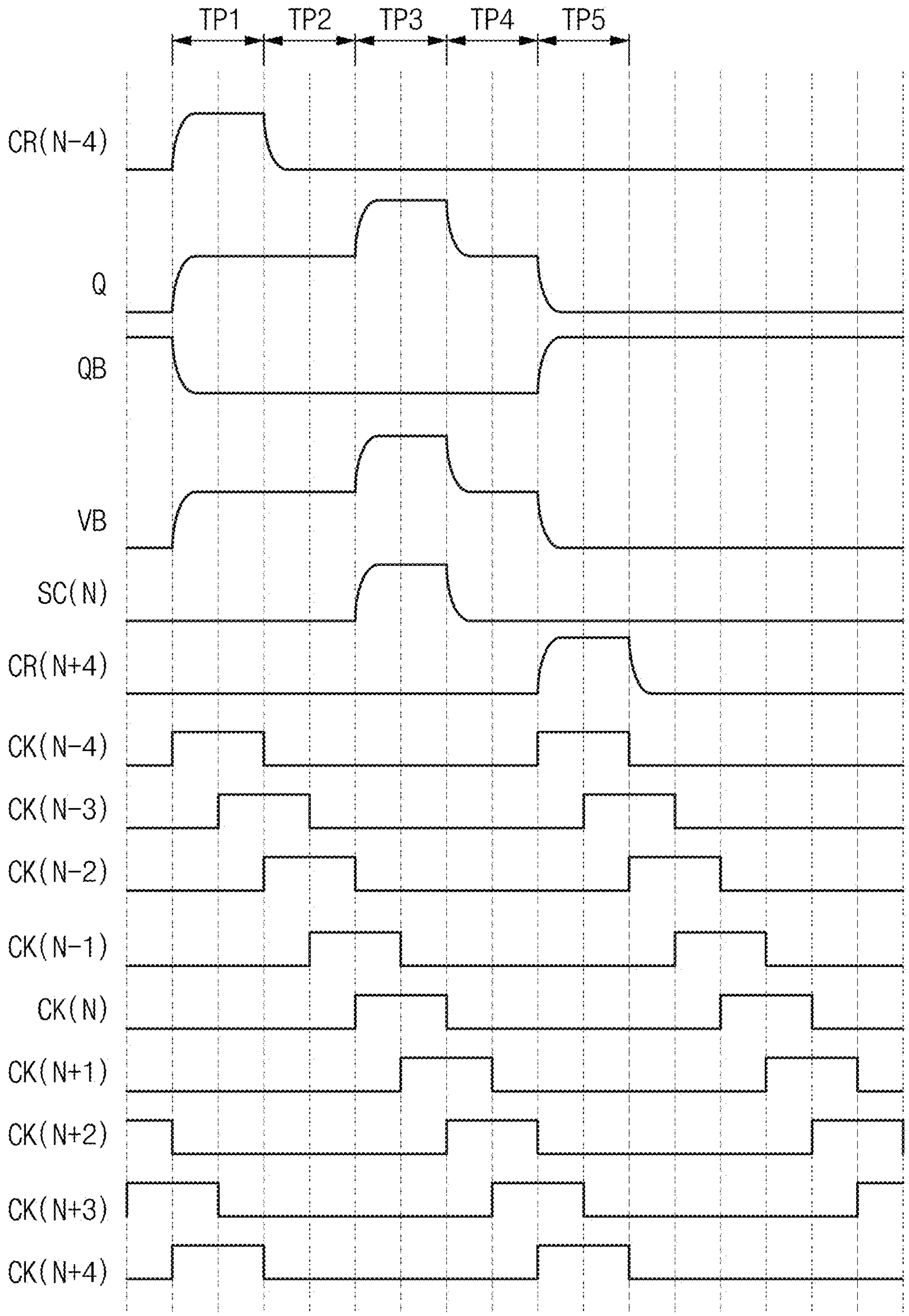
FIG. 10 is a timing chart illustrating input signals, node signals, and output signals of the Nth gate driver of FIG. 9.
Figure 11:
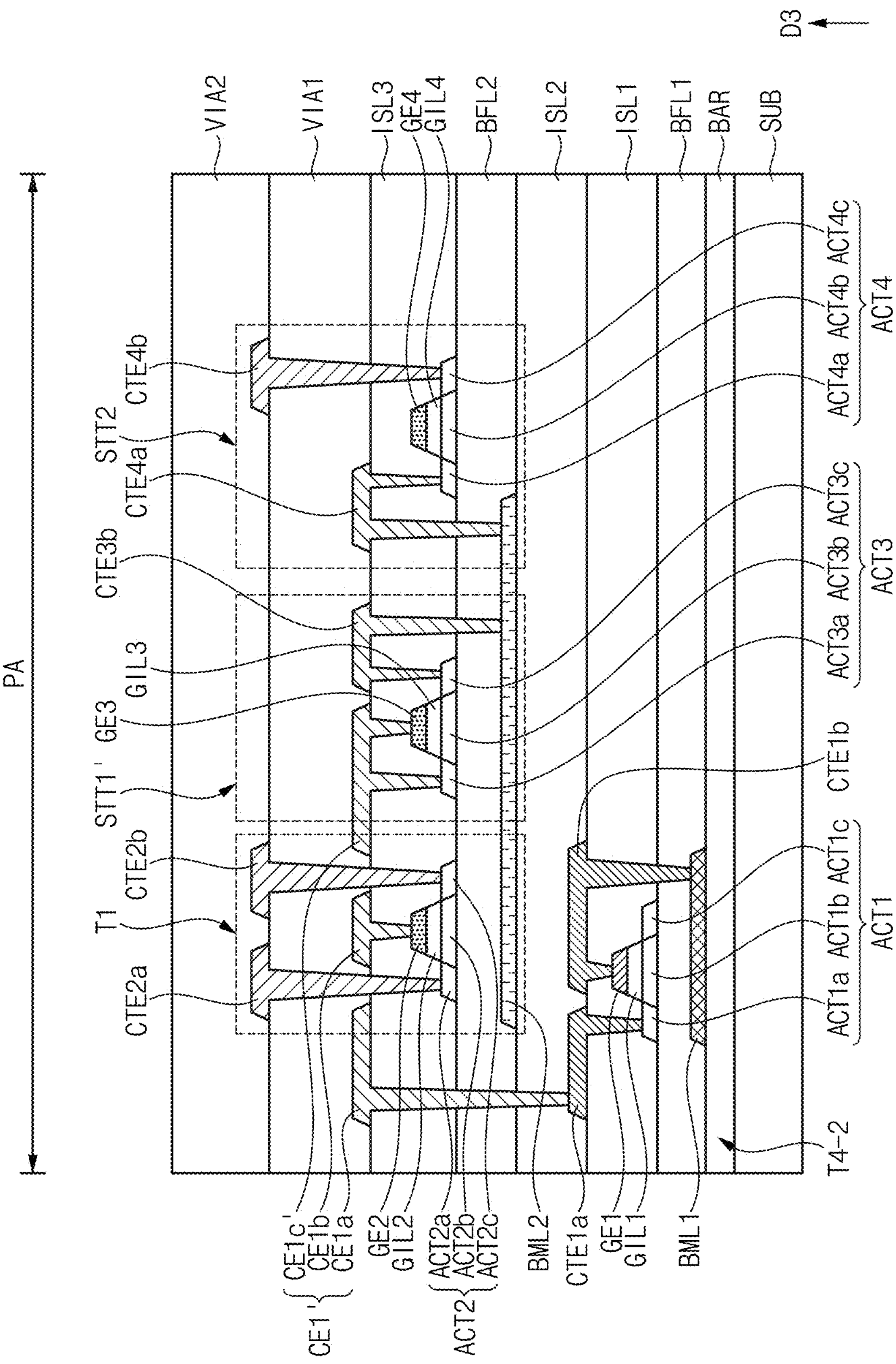
FIG. 11 is a cross-sectional view illustrating a portion of the Nth gate driver of FIG. 9.

FIG. 9 is a circuit diagram illustrating another example of the Nth gate driver of FIG. 4. FIG. 10 is a timing chart illustrating input signals, node signals, and output signals of the Nth gate driver of FIG. 9. FIG. 11 is a cross-sectional view illustrating a portion of the Nth gate driver of FIG. 9. For example, FIG. 11 is a cross-sectional view illustrating a cross-section taken along a line crossing the first transistor T1, the 4-2th transistor T4-2, a first stabilization transistor STT1', and the second stabilization transistor STT2 included in the gate driver 300 of FIG. 1.

A structure of the Nth gate driver ST[N]' described with reference to FIG. 9 may be substantially the same as or similar to the structure of the Nth gate driver ST[N] described with reference to FIG. 5, except for a connection method or a connection structure of the second terminal of the first stabilization transistor STT1'.

A timing chart for the Nth gate driver ST[N]' described with reference to FIGS. 9 and 10 may be substantially the same as or similar to the timing chart for the Nth gate driver ST[N] described with reference to FIGS. 5 and 6, except for the change in a voltage level of the stabilization node VB over time.

A structure of the Nth gate driver ST[N]' described with reference to FIGS. 9, 10, and 11 may be substantially the same as or similar to the structure of the Nth gate driver ST[N] described with reference to FIGS. 5, 6, and 7, except for a cross-sectional structure of the first stabilization transistor STT1'.

Hereinafter, the content overlapping with the content described with reference to FIGS. 5, 6, and 7 may be omitted or briefly described.

Referring to FIGS. 9 and 11, the stabilization circuit 381' may include the first stabilization transistor STT1'. The first stabilization transistor STT1' may include a gate electrode connected to the pull-up control node Q, a first electrode connected to the stabilization node VB, and a second electrode connected to the pull-up control node Q.

Unlike the first stabilization transistor STT1 of FIG. 5, the second electrode of the first stabilization transistor STT1' of FIG. 9 may be connected to the gate electrode of the first stabilization transistor STT1', and a voltage or signal applied to the pull-up control node Q may be applied to the second electrode of the first stabilization transistor STT1'.

In the third time period TP3, the stabilization node VB may have an improved maximum voltage level (e.g., a voltage level twice the high gate voltage VGH, 2VGH). In one or more embodiments, a voltage level of the stabilization node VB over time may be substantially the same as the voltage level of the pull-up control node Q over time.

In one or more embodiments, in the time third period TP3, if (e.g., when) the voltage level of the pull-up control node Q increases to have a maximum voltage level, the voltage level applied to the stabilization node VB may also increase to have an improved maximum voltage level.

For example, in the time third section TP3, as the first terminal of the first capacitor C1 is connected to the pull-up control node Q, and the second terminal of the first capacitor C1 is connected to the gate output node from which the Nth gate output signal SC(N) is output, a voltage level applied to the pull-up control node Q may increase in response to the output of the Nth gate output signal SC(N). Accordingly, the voltage level of the stabilization node VB may also increase through the second terminal of the first stabilization transistor STT1' connected to the pull-up control node Q.

The first connection electrode CE1' may include the first portion CE1*a*, the second portion CE1*b*, and a third portion CE1*c*'. The first stabilization transistor STT1' may include the third portion CE1*c*' of the first connection electrode CE1'. The third portion CE1*c*' of the first connection electrode CE1' may define the second electrode of the first stabilization transistor STT1'.

In one or more embodiments, the first connection electrode CE1' may contact a portion of the third active pattern ACT3. The third portion CE1*c*' of the first connection electrode CE1' may contact each of the fifth conductive portion ACT3*a* and the third gate electrode GE3 of the third active pattern ACT3. For example, the third portion CE1*c*' of the first connection electrode CE1' may contact each of the fifth conductive portion ACT3*a* and the third gate electrode GE3 that penetrate the third insulating layer ISL3 in the thickness direction. The third portion CE1*c*' may be provided integrally with the first portion CE1*a* and the second portion CE1*b*. For example, the third portion CE1*c*' may be provided integrally with the first portion CE1*a* and the second portion CE1*b* by being connected to each other in a plan view.

In one or more embodiments, the first connection electrode CE1' may electrically connect the gate electrode of the first stabilization transistor STT1', the second electrode of the first stabilization transistor STT1', the gate electrode of the first transistor T1, and the first electrode of the 4-1th transistor T4-1 to each other.

As described above, in the gate driver according to one or more embodiments of the present disclosure (e.g., the Nth gate driver ST[N]', each of the first stabilization transistor STT1' and the second stabilization transistor STT2 may be connected to the lower gate electrode of the first transistor T1. In addition, the first connection electrode CE1 may contact the upper gate electrode of the first transistor T1 and may not contact the second lower metal layer BML2 defining the lower gate electrode of the first transistor T1. Accordingly, a coupling phenomenon generated if (e.g., when) the second lower metal layer BML2 and the first-second contact electrode CTE1*b* arranged under (e.g., disposed under) the second lower metal layer BML2 overlap each other in a plan view may not be directly transmitted to the upper gate electrode of the first transistor T1 through the first connection electrode CE. Accordingly, an instability generated by a fluctuation in the voltage of the upper gate electrode of the first transistor T1 may be reduced.

As described above, the display device 1 of FIG. 1 according to one or more embodiments of the present disclosure may include a gate driver 300 including the gate driver, so that the gate driver 300 may operate stably, and thus, a reliability of the display device 1 may be improved. In addition, because a portion of the 4-2th transistor T4-2 and a portion of the first transistor T1 overlap in a plan view, the peripheral area PA of the display panel 100 may be reduced, so that a high-resolution display device 1 may be implemented.

Figure 12:
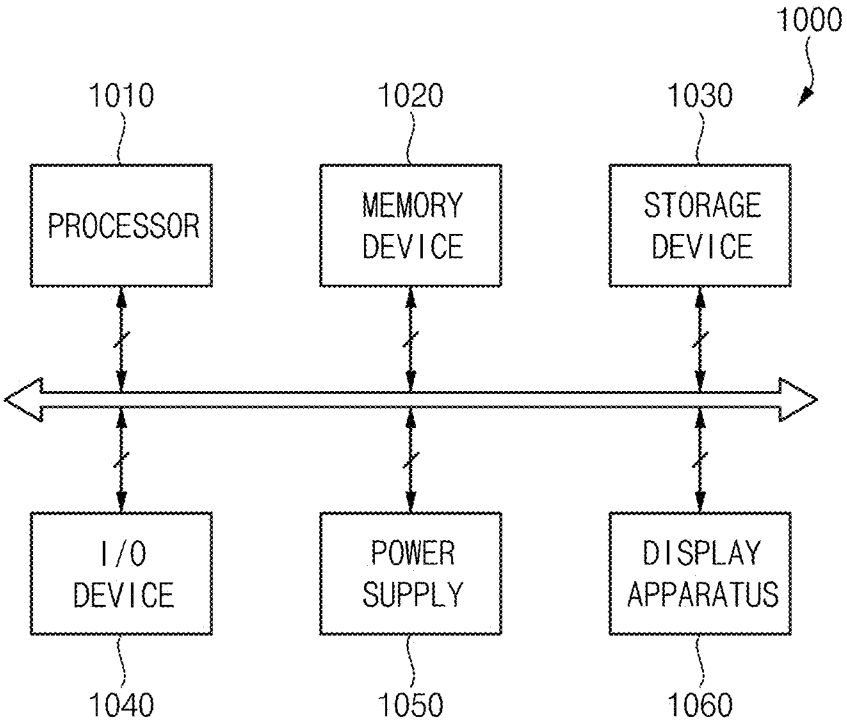
FIG. 12 is a block diagram illustrating an electronic device according to one or more embodiments of the present disclosure.

FIG. 12 is a block diagram illustrating an electronic device according to one or more embodiments of the present disclosure.

Referring to FIG. 12, an electronic device 1000 may include a processor 1010, a memory device 1020, a storage device 1030, an input/output device 1040, a power supply 1050, and a display device 1060. If (e.g., when) the electronic device 1000 includes a display device 1060, the display device 1060 may be the display device 1 of FIG. 1. In addition, the electronic device 1000 may further include several ports that may communicate with a video card, a sound card, a memory card, a USB device, or the like, or may communicate with other systems.

In one or more embodiments, the electronic device 1000 may be implemented as a smartphone. However, the type of the electronic device 1000 according to one or more embodiments of the present disclosure may be used as an example, and the type of the electronic device 1000 may not be necessarily limited thereto. For example, the electronic device 1000 may be implemented as a mobile phone, a video phone, a smart pad, a smart watch, a tablet PC, a vehicle navigation system, a computer monitor, a notebook, a head-mounted display device, and/or the like.

In one or more embodiments, the processor 1010 may be a microprocessor, a central processor (e.g., a central processing unit), an application processor, etc. The processor 1010 may be connected to other components through an address bus, a control bus, a data bus, and/or the like. According to one or more embodiments, the processor 1010 may also be connected to an expansion bus such as a Peripheral Component Interconnect (PCI) bus.

In one or more embodiments, the processor 1010 may output the input image data IMG and the input control signal CONT to the driving controller 200 of FIG. 1.

In one or more embodiments, the memory device 1020 may store data suitable for the operation of the electronic device 1000. For example, the memory device 1020 may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM), a Ferroelectric Random Access Memory (FRAM) device, and/or a volatile memory device such as a Dynamic Random Access Memory (DRAM) device, a Static Random Access Memory (SRAM) device, a mobile DRAM device, and/or the like.

In one or more embodiments, the storage device 1030 may include a solid-state drive (SSD), a hard disk drive (HDD), a CD-ROM, and/or the like.

In one or more embodiments, the input/output device 1040 may include an input means such as a keyboard, a keypad, a touchpad, a touchscreen, a mouse, etc., and an output means such as a speaker, a printer, and/or the like.

In one or more embodiments, the display device 1060 may be included in the input/output device 1040. However, the relationship between the input/output device 1040 and the display device 1060 according to one or more embodiments of the present disclosure may not be necessarily limited thereto. In one or more embodiments, the power supply 1050 may supply power suitable for the operation of the electronic device 1000. In one or more embodiments, the display device 1060 may be connected to other components through the buses or other communication links.

The circuits and the devices according to one or more embodiments may be applied to an electronic device included in a computer, a notebook, a mobile phone, a smartphone, a smart pad, a PMP, a PDA, an MP 3 player, or the like.

In the context of the present disclosure and unless otherwise defined, the terms "use/utilize," "using/utilizing," and "used/utilized" may be considered synonymous with the terms "utilize," "utilizing," and "utilized," respectively.

A person of ordinary skill in the art would appreciate, in view of the present disclosure in its entirety, that each suitable feature of the one or more suitable embodiments of the present disclosure may be combined or combined with each other, partially or entirely, and may be technically interlocked and operated in one or more suitable ways, and each embodiment may be implemented independently of each other or in conjunction with each other in any suitable manner unless otherwise stated or implied.

Although the circuits and the devices according to one or more embodiments have been described with reference to the drawings, the illustrated embodiments are examples, and may be modified and changed by a person having ordinary knowledge in the relevant technical field without departing from the technical spirit described in the following claims and equivalents thereof. Therefore, the disclosed embodiments are utilized in a generic and descriptive sense only and not for purposes of limitation. Thus, the present disclosure is not limited to the detailed description of the specification but should be defined by the appended claims, with functional equivalents thereof to be included therein.

What is claimed is:

1. A gate driver comprising:

a pull-up control circuit configured to apply a previous carry signal to a pull-up control node in response to the previous carry signal of a previous gate driver;

a buffer transistor configured to output a gate clock signal as a gate output signal in response to a signal of the pull-up control node, and comprising an upper gate electrode connected to the pull-up control node, and a lower gate electrode connected to a stabilization node;

a first stabilization transistor comprising a gate electrode connected to the pull-up control node, and a first electrode connected to the stabilization node; and a second stabilization transistor comprising a gate electrode connected to a pull-down control node, and a first electrode connected to the stabilization node.

2. The gate driver of claim 1, wherein the pull-up control circuit comprises:

a first pull-up control transistor comprising a gate electrode to which the previous carry signal is configured to be applied, a first electrode to which the previous carry signal is configured to be applied, and a second electrode; and a second pull-up control transistor comprising a gate electrode to which the previous carry signal is configured to be applied, a first electrode connected to the pull-up control node, and a second electrode connected to the second electrode of the first pull-up control transistor.

3. The gate driver of claim 2, further comprising:

a substrate;

a first lower metal layer above the substrate; and a second lower metal layer above the first lower metal layer, and comprising the lower gate electrode of the buffer transistor, wherein an active pattern of the second pull-up control transistor and the gate electrode of the second pull-up control transistor are between the first lower metal layer and the second lower metal layer in a cross-sectional view, and wherein an active pattern of the buffer transistor and the upper gate electrode of the buffer transistor are above the second lower metal layer.

4. The gate driver of claim 3, further comprising a connection electrode electrically connecting the upper gate electrode of the buffer transistor and the second electrode of the second pull-up control transistor.

5. The gate driver of claim 4, wherein the connection electrode contacts the gate electrode of the first stabilization transistor.

6. The gate driver of claim 4, wherein the connection electrode is separated from the second lower metal layer in a cross-sectional view.

7. The gate driver of claim 4, wherein a first electrode of the buffer transistor and a second electrode of the buffer transistor are above the connection electrode.

8. The gate driver of claim 4, wherein the first stabilization transistor further comprises a second electrode to which a high gate voltage defining a high level of the gate output signal is configured to be applied.

9. The gate driver of claim 8, wherein the second electrode of the first stabilization transistor is above the connection electrode.

10. The gate driver of claim 4, wherein the first stabilization transistor further comprises a second electrode connected to the pull-up control node.

11. The gate driver of claim 10, wherein the connection electrode comprises the second electrode of the first stabilization transistor.

12. The gate driver of claim 11, wherein the second electrode of the first stabilization transistor is at a same layer as the connection electrode.

13. The gate driver of claim 3, wherein the second lower metal layer overlaps the second electrode of the second pull-up control transistor.

14. The gate driver of claim 1, wherein the second stabilization transistor further comprises a second electrode configured to receive a low voltage.

15. A display device comprising:

a substrate comprising a display area, and a peripheral area adjacent to the display area;

a first lower metal layer in the peripheral area above the substrate;

a pull-up control transistor in the peripheral area above the first lower metal layer, and comprising a first active pattern, and a first gate electrode above the first active pattern;

a second lower metal layer in the peripheral area above the first gate electrode of the pull-up control transistor;

a buffer transistor in the peripheral area above the second lower metal layer, and comprising a second active pattern overlapping the second lower metal layer, and a second gate electrode above the second active pattern;

a first stabilization transistor in the peripheral area above the second lower metal layer, and comprising a third active pattern overlapping the second lower metal layer, and a third gate electrode above the third active pattern;

a connection electrode above the second gate electrode and the third gate electrode, and contacting the second gate electrode and the third gate electrode; and a light-emitting element in the display area above the connection electrode.

16. The display device of claim 15, wherein the connection electrode is separated from the second lower metal layer.

17. The display device of claim 15, wherein the connection electrode contacts a portion of the third active pattern.

18. The display device of claim 15, further comprising a second stabilization transistor in the peripheral area above the second lower metal layer, and comprising a fourth active pattern overlapping the second lower metal layer, and a fourth gate electrode above the fourth active pattern, wherein the third active pattern, the fourth active pattern, and the second lower metal layer are electrically connected.

19. The display device of claim 18, further comprising:

at least one pixel comprising the light-emitting element in the display area;

a gate driver configured to output a gate output signal, in the peripheral area, and comprising the pull-up control transistor, the buffer transistor, the first stabilization transistor, and the second stabilization transistor; and a gate line configured to transmit the gate output signal to the pixel.

20. An electronic device comprising:

a display panel comprising at least one pixel, a gate line electrically connected to the pixel, or a data line electrically connected to the pixel;

a gate driver configured to output a gate output signal to the gate line, and comprising:

a pull-up control circuit configured to apply a previous carry signal to a pull-up control node in response to the previous carry signal of a previous gate driver;

a buffer transistor configured to output a gate clock signal as the gate output signal in response to a signal of the pull-up control node, and comprising an upper gate electrode connected to the pull-up control node, and a lower gate electrode connected to a stabilization node;

a first stabilization transistor comprising a gate electrode connected to the pull-up control node, and a first electrode connected to the stabilization node; and a second stabilization transistor comprising a gate electrode connected to a pull-down control node, and a first electrode connected to the stabilization node;

a data driver configured to output a data voltage to the data line;

a driving controller configured to control the display panel, the gate driver, and the data driver; and a processor configured to output input image data and an input control signal to the driving controller.

* * * * *